United States Patent
Nagare et al.

(10) Patent No.: US 11,227,367 B2
(45) Date of Patent: Jan. 18, 2022

(54) IMAGE PROCESSING DEVICE, IMAGE PROCESSING METHOD AND STORAGE MEDIUM

(71) Applicant: NEC Corporation, Tokyo (JP)

(72) Inventors: Madhuri Mahendra Nagare, Tokyo (JP); Hirofumi Aoki, Tokyo (JP); Kazutoshi Sagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 16/644,560

(22) PCT Filed: Sep. 8, 2017

(86) PCT No.: PCT/JP2017/032530
§ 371 (c)(1),
(2) Date: Mar. 5, 2020

(87) PCT Pub. No.: WO2019/049324
PCT Pub. Date: Mar. 14, 2019

(65) Prior Publication Data
US 2020/0265562 A1    Aug. 20, 2020

(51) Int. Cl.
*G06T 5/00* (2006.01)
*G06T 7/12* (2017.01)

(52) U.S. Cl.
CPC .......... *G06T 5/008* (2013.01); *G06T 7/12* (2017.01); *G06T 2207/10036* (2013.01)

(58) Field of Classification Search
CPC combination set(s) only.
See application file for complete search history.

(56) References Cited

U.S. PATENT DOCUMENTS 5,612,901 A * 3/1997 Gallegos .............. G06K 9/0063
348/144
8,594,375 B1 * 11/2013 Padwick .............. G06K 9/4652
382/103
(Continued)

FOREIGN PATENT DOCUMENTS

JP    2001-143054 A    5/2001
JP    2002-122667 A    4/2002
(Continued)

OTHER PUBLICATIONS

International Search Report for PCT Application No. PCT/JP2017/032530, dated Nov. 28, 2017.
(Continued)

*Primary Examiner* — Zhiyu Lu
(74) *Attorney, Agent, or Firm* — Sughrue Mion, PLLC

(57) ABSTRACT

An image processing device which is capable of accurately detect pixels covered by cloud shadows and remove effects of the cloud shadows in an images are provided. The device includes: a cloud transmittance calculation unit that calculates transmittance of the one or more clouds in an input image, for each pixel; a cloud height estimation unit that determines estimation of a height from the ground to each cloud in the input image to detect position of corresponding one or more shadows; an attenuation factor estimation unit that calculates attenuation factors for the direct sun irradiance by applying an averaging filter to the cloud transmittance calculated; and a shadow removal unit that corrects pixels affected by the one or more shadows, based on a physical model of a cloud shadow formation by employing the attenuation factors calculated and the position, and outputs an image which includes the pixels corrected.

18 Claims, 19 Drawing Sheets

(56) References Cited

U.S. PATENT DOCUMENTS

| | | | | |
|---|---|---|---|---|
| 2005/0114026 | A1* | 5/2005 | Boright | G01W 1/00 |
| | | | | 702/3 |
| 2005/0175253 | A1* | 8/2005 | Li | G06T 5/50 |
| | | | | 382/260 |
| 2013/0004065 | A1* | 1/2013 | Ma | G06T 7/90 |
| | | | | 382/165 |
| 2013/0064420 | A1 | 3/2013 | Amin et al. | |
| 2014/0083413 | A1 | 3/2014 | Bibi et al. | |
| 2014/0268094 | A1 | 9/2014 | Leonard et al. | |
| 2015/0006080 | A1 | 1/2015 | Yamazaki et al. | |
| 2015/0161768 | A1* | 6/2015 | Ardouin | G06K 9/0063 |
| | | | | 382/113 |
| 2017/0161584 | A1 | 6/2017 | Guan et al. | |
| 2017/0357872 | A1* | 12/2017 | Guan | G06K 9/4661 |

FOREIGN PATENT DOCUMENTS

| | | |
|---|---|---|
| JP | 2005-157561 A | 6/2005 |
| JP | 2013-165176 A | 8/2013 |
| WO | 2015/157643 A1 | 10/2015 |

OTHER PUBLICATIONS

English translation of Written opinion for PCT Application No. PCT/JP2017/032530.

Richter, R. and Muller, A., "De-shadowing of satellite/airborne imagery," International Journal of Remote Sensing (vol. 26, Issue: 3, Aug. 2005), pp. 3137-3148. Germany.

Xu, M., Pickering, M., Plaza, A.J. and Jia, X., "Thin Cloud Removal Based on Signal Transmission Principles and Spectral Mixture Analysis," IEEE Transactions on Geoscience and Remote Sensing (vol. 54, Issue: 3, Mar. 2016), pp. 1659-1669., USA.

Khlopenkov, K. V., and Trishchenko, A. P., "SPARC: New cloud, snow, and cloud shadow detection scheme for historical 1-km AVHHR data over Canada," Journal of Atmospheric and Oceanic technology (vol. 24, Issue: 3, Mar. 2007), pp. 322-343., Canada.

Luo, Y., Trishchenko, A., Khlopenkov, K., "Developing clear-sky, cloud and cloud shadow mask for producing clear-sky composites at 250-meter spatial resolution for the seven MODIS land bands over Canada and North America", Remote Sensing of Environment, vol. 112, issue 12, pp. 4167-4185, Dec. 2008., Canada.

* cited by examiner

Fig. 2

11 CLOUD DATA STORAGE

| CLOUD TYPE | CLOUD TYPE LABEL | CLOUD HEIGHT | BAND1 | BAND2 | BAND3 | BAND4 | BAND5 | BAND6 | BAND7 |
|---|---|---|---|---|---|---|---|---|---|
| WAVELENGTH (μM) | | | 0.44 | 0.48 | 0.56 | 0.65 | 0.87 | 1.61 | 2.20 |
| CIRRUS | CLOUD 1 | 6 KM | 0.229 | 0.241 | 0.233 | 0.229 | 0.175 | 1.16 | 1.19 |
| | | | ... | ... | ... | ... | ... | ... | ... |
| | | | 0.227 | 0.243 | 0.235 | 0.227 | 0.175 | 1.14 | 1.18 |
| ... | | | | | | | | | |
| ALTOCUMULUS | CLOUD N | 2 KM | 0.718 | 0.719 | 0.719 | 0.709 | 0.680 | 0.455 | 0.561 |
| | | | ... | ... | ... | ... | ... | ... | ... |
| | | | 0.712 | 0.725 | 0.715 | 0.711 | 0.685 | 0.450 | 0.562 |

Fig. 3

|  |  |  |
|---|---|---|
| $P_{1C}$ | . . . | $P_{RC}$ |
| ⋮ |  | ⋮ |
| $P_{11}$ | . . . | $P_{R1}$ |

Fig. 5

| g(1,3) 1/9 | g(2,3) 1/9 | g(3,3) 1/9 |
|---|---|---|
| g(1,2) 1/9 | g(2,2) 1/9 | g(3,2) 1/9 |
| g(1,1) 1/9 | g(2,1) 1/9 | g(3,1) 1/9 |

Fig. 7

| ... | ... | ... | $P_{area}$ | ... | ... | ... | ... | ... | ... |
|---|---|---|---|---|---|---|---|---|---|
| ... | 0.14 | 0.30 | 0.43 | 0.29 | 0.13 | 0 | 0 | 0 | ... |
| ... | 0.20 | 0.44 | 0.64 | 0.45 | 0.20 | 0 | 0 | 0 | ... |
| ... | 0.13 | 0.33 | 0.55 | 0.42 | 0.22 | 0 | 0 | 0 | ... |
| ... | 0.06 | 0.19 | 0.34 | 0.28 | 0.15 | 0.02 | 0.02 | 0.02 | ... |
| ... | 0 | 0.05 | 0.12 | 0.12 | 0.07 | 0.06 | 0.08 | 0.08 | ... |
| ... | 0 | 0.03 | 0.07 | 0.13 | 0.17 | 0.24 | 0.22 | 0.15 | ... |
| ... | 0 | 0.04 | 0.12 | 0.23 | 0.32 | 0.38 | 0.31 | 0.19 | ... |
| ... | 0 | 0.04 | 0.12 | 0.23 | 0.32 | 0.35 | 0.25 | 0.13 | ... |
| ... | ... | ... | ... | ... | ... | ... | ... | ... | ... |

IMAGE PROCESSING DEVICE, IMAGE PROCESSING METHOD AND STORAGE MEDIUM

This application is a National Stage Entry of PCT/JP2017/032530 filed on Sep. 8, 2017, the contents of all of which are incorporated herein by reference, in their entirety.

TECHNICAL FIELD

The present invention is related to an image processing device, an image processing method and an image processing program for detecting and correcting pixels beneath shadows of clouds in images captured by sensors on space-borne platforms.

BACKGROUND ART

Satellite images have vital applications, such as monitoring the earth surface. However, if a cloud is present while capturing an image, then it poses a serious limitation on the image's reliability. A cloud not only appears in the image but also casts a shadow on the ground, occluding (covering) the true ground information.

In case of satellite images, an incident sun irradiance on the ground has two components, namely, the direct sun irradiance and the diffused sun irradiance. An object such as a cloud casts a shadow by attenuating the direct sun irradiance. Therefore areas beneath a shadow do not receive full irradiance. Consequently such areas appear darker and hide the true ground information. It is necessary to retrieve the true ground information by removing these shadows (known as de-shadowing).

NPL 1 discloses a de-shadowing method for airborne and satellite imagery, which estimates an attenuation factor for the direct sun irradiance to correct a shadow pixel. FIG. 19 shows a block diagram of an apparatus used by the method. The apparatus includes: pre-processing unit 01, matched filter derivation unit 02, attenuation factor estimation unit 03, shadow removal unit 04, and output unit 05. Pre-processing unit 01 detects water and cloud pixels which are excluded from the next processes. The detection is based on spectral conditions. Matched filter derivation unit 02 tunes a matched filter vector calculated by the equation (1) to the target shadow reflectance.

$$V_{mf} = \frac{C^{-1}(r_T - \bar{r})}{(r_T - \bar{r})^T C^{-1}(r_T - \bar{r})} \quad (1)$$

$V_{mf}$ is a matched filter vector
$r_T$ is a target reflectance to which the matched filter is to be tuned
C is a covariance matrix for non-cloud and non-water pixels
$\bar{r}$ a mean vector for non-cloud and non-water pixels The method sets $r_T$ to 0 in equation (1) to detect shadows. The resulting filter ($V_{sh}$) is a column vector of dimension $k_f \times 1$ where $k_f$ is a number of wavelength bands considered to calculate the covariance matrix and mean vector. Attenuation factor estimation unit 03 applies the filter $V_{sh}$ to all non-cloud and non-water pixels to get the shadow abundance in respective pixels. The method assumes that the resulting values are a relative measure of the attenuation factor for the direct sun irradiance for respective pixels. The obtained values are positive and negative numbers in an arbitrary, image-dependent range. Therefore, attenuation factor estimation unit 03 scales the shadow abundance values to a range [0, 1] (from 0 to 1) such that '0' indicates no direct illumination (full shadow) and '1' indicates full direct illumination (no shadow). The method in NPL 1 defines a core shadow as an actual shadow in contrast to other dark objects in an image. Shadow removal unit 04 first detects pixels actually covered by shadows by an image thresholding method. Shadow removal unit 04 determines a threshold for the shadow abundance values obtained by attenuation factor estimation unit 03 based on a histogram slicing technique. The detected pixels using this threshold form core shadow areas. Further, shadow removal unit 04 expands the core shadow areas spatially. Then shadow removal unit 04 corrects pixels in the core shadow areas based on a physical model of a cloud shadow formation by employing the attenuation factors determined by attenuation factor estimation unit 03. Output unit 05 sends an output to a display (not shown in FIG. 19).

In addition, related technologies are disclosed in PTL 1-PTL 3, NPL 2-NPL 4.

CITATION LIST

Patent Literature

[PTL 1] Japanese published unexamined application No. 2002-122667
[PTL 2] Japanese published unexamined application No. 2005-157561
[PTL 3] Japanese published unexamined application No. 2013-165176

Non Patent Literature

[NPL 1] Richter, R. and Muller, A., "De-shadowing of satellite/airborne imagery," International Journal of Remote Sensing (Volume: 26, Issue: 3, August 2005), Page(s): 3137-3148.
[NPL 2] Xu, M., Pickering, M., Plaza, A. J. and Jia, X., "Thin Cloud Removal Based on Signal Transmission Principles and Spectral Mixture Analysis," IEEE Transactions on Geoscience and Remote Sensing (Volume: 54, Issue: 3, March 2016), Page(s): 1659-1669.
[NPL 3] Khlopenkov, K. V., and Trishchenko, A. P., "SPARC: New cloud, snow, and cloud shadow detection scheme for historical 1-km AVHHR data over Canada," Journal of Atmospheric and Oceanic technology (Volume: 24, Issue: 3, March 2007), Page(s): 322-343.
[NPL 4] Luo, Y., Trishchenko, A., Khlopenkov, K., "Developing clear-sky, cloud and cloud shadow mask for producing clear-sky composites at 250-meter spatial resolution for the seven MODIS land bands over Canada and North America", Remote Sensing of Environment, vol. 112, issue 12, pp. 4167-4185, December, 2008.

SUMMARY OF INVENTION

Technical Problem

The method disclosed in NPL 1 provides an approach for the shadow detection as well as for the shadow removal. However, the method estimates an attenuation factor for the direct sun irradiance by a method of matched filtering which is not based on a physical model, that is, actual phenomena occurring during a shadow formation. When a shadow is formed due to a cloud, optical properties of the cloud play an important role. However, the method of NPL 1 doesn't consider a model for cloud optical properties to derive the attenuation factor. Therefore, there is a possibility that the estimated attenuation factor is different from the actual attenuation factor. Thus, the method cannot guarantee a radiometrically correct output.

The present invention has been made to solve the problem described above. One of the objectives of the present invention is to provide an image processing device, an image processing method and an image processing program which is capable of accurately detecting pixels covered by cloud shadows and removing effects of the cloud shadows in an image.

Solution to Problem

In order to solve the above-mentioned problem, a first example aspect of the present invention is an image processing device for detection and correction of influence caused by one or more clouds. The device includes: a cloud transmittance calculation unit that calculates transmittance of the one or more clouds in an input image, for each pixel; a cloud height estimation unit that determines an estimation of a height from the ground to each cloud in the input image for the each pixel to detect position of corresponding one or more shadows; an attenuation factor estimation unit that calculates attenuation factors for the direct sun irradiance by applying an averaging filter to the cloud transmittance calculated, for the each pixel; and a shadow removal unit that corrects pixels affected by the one or more shadows, based on a physical model of a cloud shadow formation by employing the attenuation factors calculated, and outputs an image which includes the pixels corrected.

A second example aspect of the present invention is an image processing method for detection and correction of influence caused by one or more clouds. The method includes: calculating transmittance of the one or more clouds in an input image, for each pixel; determining estimation of a height from the ground to each cloud in the input image for the each pixel to detect position of corresponding one or more shadows; calculating attenuation factors for the direct sun irradiance by applying an averaging filter to the cloud transmittance calculated, for the each pixel; and removing the one or more shadows by correcting pixels affected by the one or more shadows, based on a physical model of a cloud shadow formation by employing the attenuation factors calculated and the position, and outputting an image which includes the pixels corrected.

A third example aspect of the present invention is an image processing program causing a computer to detect and correct influence caused by one or more clouds. The program includes: calculating transmittance of the one or more clouds in an input image, for each pixel; determining estimation of a height from the ground to each cloud in the input image for the each pixel to detect position of corresponding one or more shadows; calculating attenuation factors for the direct sun irradiance by applying an averaging filter to the cloud transmittance calculated, for the each pixel; and removing the one or more shadows by correcting pixels affected by the one or more shadows, based on a physical model of a cloud shadow formation by employing the attenuation factors calculated and the position, and outputting an image which includes the pixels corrected.

The object of the present invention can also be achieved by a computer-readable recoding medium on which the program is stored.

Advantageous Effects of Invention

According to the present invention, an image processing device, an image processing method, and an image processing program, which is capable of accurately detecting pixels covered by cloud shadows and removing effects of the cloud shadows in an images are provided.

BRIEF DESCRIPTION OF DRAWINGS

FIG. 2 is an example of table in cloud data storage.
FIG. 3 is an example for R×C transmittance matrix.
FIG. 5 is an example of a simple averaging filter
FIG. 7 shows a matrix of attenuation factors obtained by averaging the transmittance matrix for a subset shown in FIG. 4.

Figure 1:
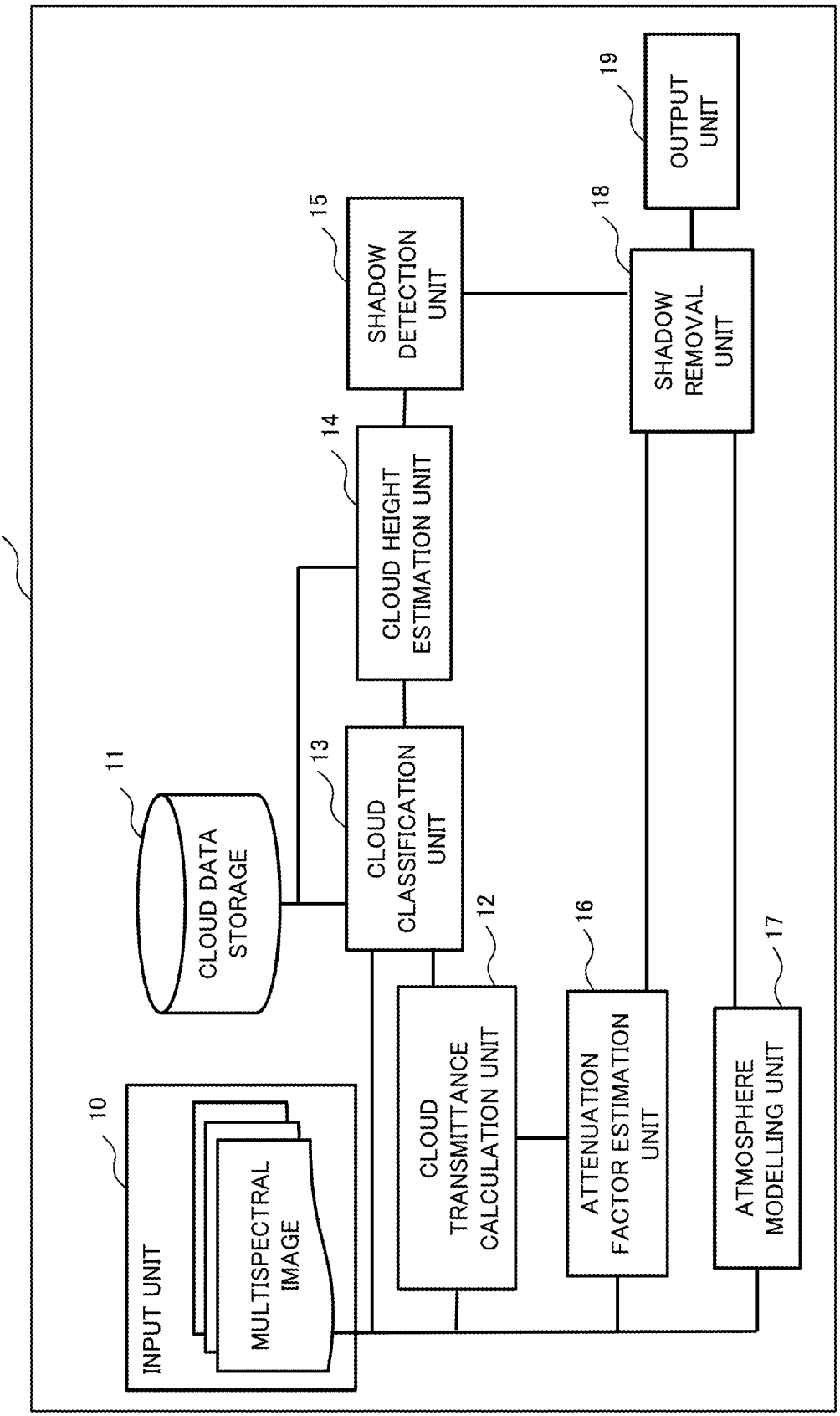
FIG. 1 is a block diagram of the first example embodiment in accordance with the present invention.

Skilled artisans will appreciate that elements in the figures are illustrated for simplicity and clarity and have not necessarily been drawn to the scale. For example, the dimensions of some of the elements in the figures illustrating the physical model of a cloud shadow formation, may be exaggerated relative to other elements to help to improve understanding of the present and alternate example embodiments.

DESCRIPTION OF EMBODIMENTS

Satellite images which are captured by sensors on space-borne platforms provide huge amount of information about the earth surface. Many space-borne platforms have sensors capable of capturing multispectral or hyperspectral images. Multispectral or hyperspectral images hold energy reflected from the earth surface in much more wavelength bands than that of RGB images. The captured reflectance characterizes objects on the ground. However, the quality of information in the captured images depends on the state of atmosphere at the time of capturing, the geometry of capturing etc. Satellite images are often affected by haze, fog or clouds in the atmosphere. A cloud cover in the atmosphere poses the most serious limitation on the reliable use of images in practical applications. Around ⅔rd of the land surface is covered by clouds throughout the year, which makes getting a cloud-free scene difficult. In addition to occluding an upward reflectance signal, the cloud hinders an incoming solar radiation reaching to the ground, thereby casting a shadow on the ground and shading the true ground information. If an image with a cloud shadow is processed for a high level analysis, such as Land Use Land Cover (LULC) classification, then erroneous results will be obtained. Therefore, the detection of parts in an image covered by cloud shadows is an important preprocessing task. After the detection of cloud shadows, removing them gives an additional benefit of retrieving the true ground information beneath the shadows. An incident sun irradiance on the ground has two components, specifically, the direct sun irradiance and the diffused sun irradiance. A shadow is cast due to attenuation of the direct sun irradiance by an occluding object such as a cloud. However, some reflectance is captured in the shadowed parts due to the incident diffused sun irradiance. This captured reflectance makes retrieving of the true ground reflectance in the shadowed parts possible.

The method in NPL 1 provides an approach to the removal of shadows. However, the method is very sensitive to the detection and removal of water pixels. In addition, complex computations in the method demand increased computer resources. The key limitation of the method arises from ignoring the information about the occluding object for the shadow removal. Considering a physical model, optical properties of the occluding object are important to characterize its shadow. For a cloud shadow, accuracy of the cloud shadow removal will be improved if estimation of optical properties of the occluding cloud is performed correctly.

The key idea of our embodiments is to use cloud transmittance values for cloud shadow removal. An approach of using cloud transmittance for the shadow removal is based on actual phenomenon happening during a shadow formation (referred to as "physical model", hereinafter).

Figure 16:
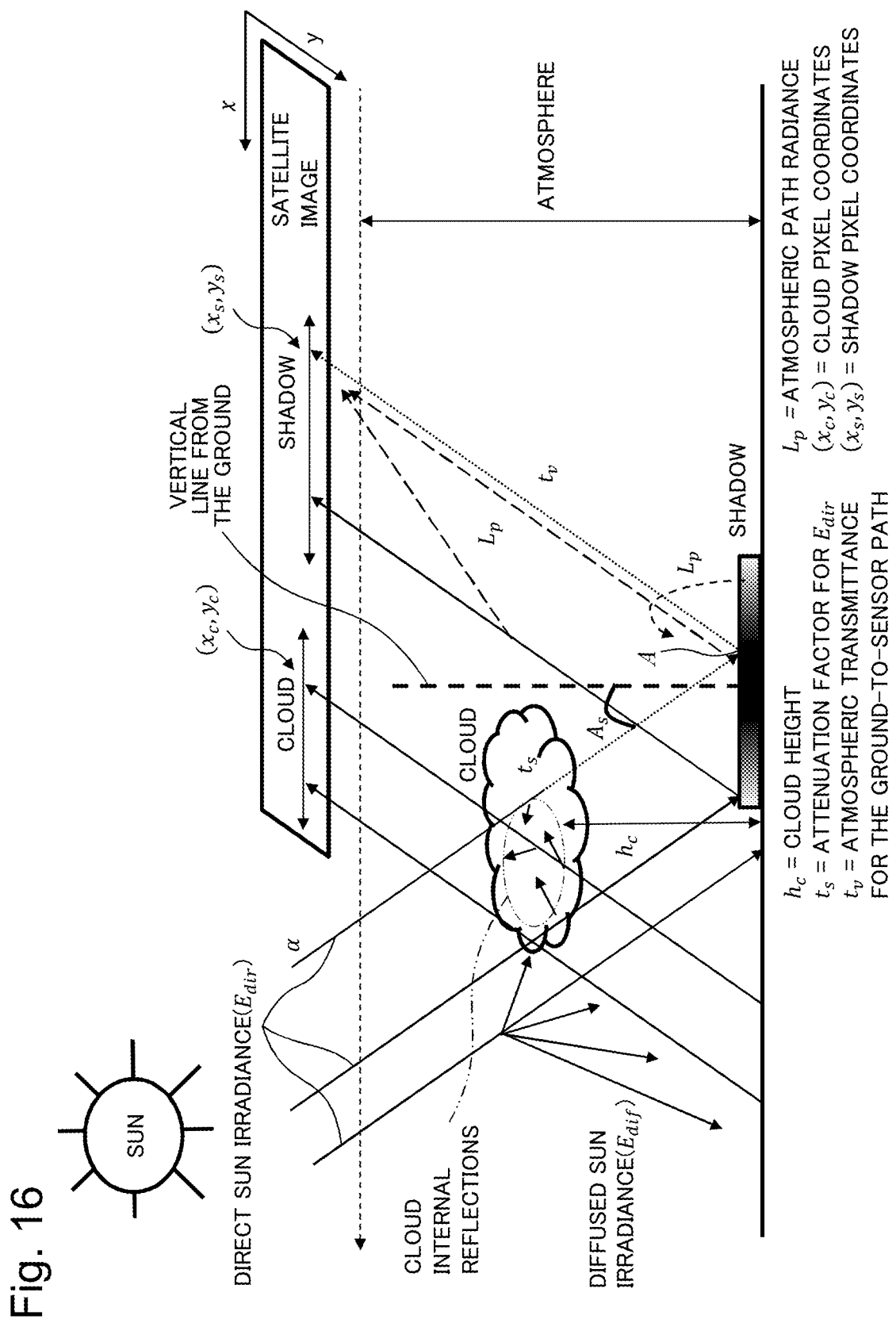
FIG. 16 is a depiction of an exemplary physical model of a cloud shadow formation.

FIG. 16 shows an exemplary physical model of a cloud shadow formation. The irradiation emitted from the sun penetrates the atmosphere (some are absorbed by a cloud), reflected by the ground, and penetrates the atmosphere again toward the satellite side. A satellite system receives this reflected light. To explain the phenomenon occurring during the cloud shadow formation, FIG. 16 depicts exemplary rays of sun irradiance. Here, one of the rays is called ray α. The ray α originates from the sun and travels towards the ground. On this path, it encounters a cloud. A part of the ray α gets reflected from the top of the cloud and creates a pixel $(x_c, y_c)$ in a satellite image. The position coordinates in this image are indicated by the x and y axes. Remaining part of the ray α traverse through the cloud and undergoes complex phenomenon such as multiple reflections (cloud internal reflections). Some of other rays are diffused in the atmosphere. After these processes, the ray α reaches to the ground and gets reflected by the point 'A'. The reflected ray α contains information of the ground object at the point 'A'. This ray α again traverse through the atmosphere in the upward direction and reaches to the satellite. Since this ray α gets attenuated due to the cloud, the point 'A' doesn't receive full illumination therefore this ray forms a shadowed pixel $(x_s, y_s)$ in the satellite image.

In FIG. 16, a radiance received for a pixel covered by a cloud has a reflected energy from the ground and the reflected energy from a top side (space side against the earth side) of the cloud surface. For a pixel, the cloud transmittance can be estimated by unmixing the pixel (Refer to NPL 2 for details). This transmittance obtained by unmixing a pixel is a transmittance at a point on the top-side-of-cloud. However, before reaching to the ground, the radiation is affected by the cloud's internal processes. These internal processes affect the top-side-of-cloud reflectance for the neighboring pixels. Therefore, the attenuation in the direct sun irradiance due to a cloud at a pixel which noted by coordinate $(x_c, y_c)$ can be estimated by considering cloud transmittance not only at the $(x_c, y_c)$, but at its neighboring pixels as well.

Considering atmospheric phenomena shown in FIG. 16, the true ground reflectance for a shadow pixel can be retrieved by equation (2) shown below. Every term except constants in equation (2) is in a particular wavelength.

$$r(x_s, y_s) = \frac{\pi\{d^2[c_0 + c_1 I_{DN}(x_s, y_s)] - L_p(x_s, y_s)\}}{t_v[E_{dir}t_s\cos A_s + E_{dif}]} \quad (2)$$

where r is the true ground reflectance for a shadow pixel $(x_s, y_s)$ in a particular wavelength, $I_{DN}$ is a digital number recorded by a satellite sensor at the pixel for the particular wavelength, $c_0$ and $c_1$ are an offset and a gain for the particular wavelength, respectively, to convert the digital number to the radiance, d is the distance between the earth and the sun at the time of capturing the image in astronomical units, $L_p$ is the atmospheric path radiance at the pixel for the particular wavelength, $t_v$ is an atmospheric transmittance on the ground-to-sensor path, $E_{dir}$ is the direct sun irradiance for the particular wavelength, $E_{dif}$ is the diffused sun irradiance for the particular wavelength, $A_s$ is a solar zenith angle and $t_s$ is an attenuation factor by which the direct sun irradiance gets attenuated due to an occluding object such as a cloud to form a shadow. In the equation (2), values for $L_p$, $E_{dir}$, $E_{dif}$, $t_v$ can be obtained by established atmospheric models. Thus, the true ground reflectance for a shadow pixel can be determined by plugging in the accurate attenuation factor $t_s$ in the equation (2).

Atmospheric phenomena depicted in FIG. 16 and the mathematical formulation of them in the equation (2) show an exemplary situation. In practice, more complex or simpler atmospheric phenomena can be considered on the similar lines.

The transmittance on the sun-to-ground path is affected by various factors on the path such as other gas molecules e.g. $CO_2$, water molecules, cloud, haze etc. In our embodiments, we assumed that this transmittance is affected only by clouds and not due to other factors. Therefore, on the sun-to-ground path transmittance in parts of atmosphere other than a cloud has no effect.

Embodiments described below explain a method to detect and to correct a shadow pixel accurately by estimating the attenuation factors from an input image.

Each example embodiment of the present invention, which can solve the above mentioned problems, will be described below with a reference to figures. The following detailed descriptions are merely exemplary in nature and are not intended to limit the invention or the application and uses of the invention. Furthermore, there is no intention to be bound by any theory presented in the preceding background of the invention or the following detailed description.

First Example Embodiment

Image Processing Device

Except a path through a cloud, considering an atmospheric transmittance on the sun-to-ground path as one, an attenuation in the direct sun irradiance ($t_s$) will be determined by the transmittance of the cloud along the path. Estimating the transmittance of the occluding cloud and employing it for the shadow removal can improve the accuracy of the correction. In the first embodiment, an image processing device which estimates the attenuation factor for the direct sun irradiance ($t_s$) from the transmittance of the occluding cloud to obtain accurate shadow removal results is described.

Referring to FIG. 1, image processing device 100 of the first example embodiment includes: input unit 10, cloud data storage 11, cloud transmittance calculation unit 12, cloud classification unit 13, cloud height estimation unit 14, shadow detection unit 15, attenuation factor estimation unit 16, atmosphere modelling unit 17, shadow removal unit 18 and an output unit 19.

Cloud data storage 11 stores domain knowledge about clouds. Here, domain knowledge means knowledge in a specialized discipline. So, domain knowledge about clouds means specialized cloud information such as types (classes) of clouds, their typical heights above the ground and their spectral signatures. Cloud data storage 11 stores spectral signatures and examples of different classes (kinds) of clouds along with a look-up table of cloud classes and their typical heights above the ground. The table can be made by a domain expert or an application which can learn the knowledge from example images and generate the table. FIG. 2 shows an exemplary cloud data storage 11. Items of the table includes "Cloud type", "Cloud type label", "Cloud height" and "Band 1, . . . , Band 7" (hereinafter, it might be called just "Bands"). "Cloud type label" refers to kinds of cloud, such as cirrus, altocumulus. "Cloud height" refers to typical heights of each cloud type above the ground. "Bands" refers to typical reflectance of a particular cloud type in a number of wavelength bands (from 1 to 7). Information in the cloud data storage 11 is available to the cloud classification unit 13 and the cloud height estimation unit 14.

Input unit 10 inputs images (multispectral images) from other external device such as a satellite system. Input unit 10 can also accept hyperspectral images.

Cloud transmittance calculation unit 12 receives an input image from input unit 10 and calculates estimation of the transmittance of clouds appearing in the image by using an existing method. For example, NPL 2 discloses a method, that is, for a pixel, the transmittance of a cloud cover is estimated based on an abundance of the cloud in the pixel. As explained in the method of NPL 2, the transmittance of a cloud ($C_t$) is given as $$C_t = 1 - g \qquad (3)$$

where 'g' is a relative thickness factor of a cloud. The factor g varies from 0 to 1 according to relative thickness of a cloud with respect to a thick cloud. If g=1, it means thick clouds. These clouds are opaque clouds for which the transmittance is 0. The method assumes a cloud as an endmember and unmixes a pixel to give a cloud abundance (a relative proportion in a pixel) which is approximated as g. An endmember represents a pure land cover class in an image. A choice of the land cover class (endmember) depends on an application. For example, in a change detection application, endmembers can be vegetation, water etc. while in vegetation monitoring, endmembers can be cedar or cypress. The model in NPL 2 applies the linear unmixing technique to determine g. For the unmixing, cloud transmittance calculation unit 12 extracts a cloud spectrum. If multiple classes of clouds are present in an image, then the cloud transmittance calculation unit 12 extracts multiple cloud spectra.

Figure 3:
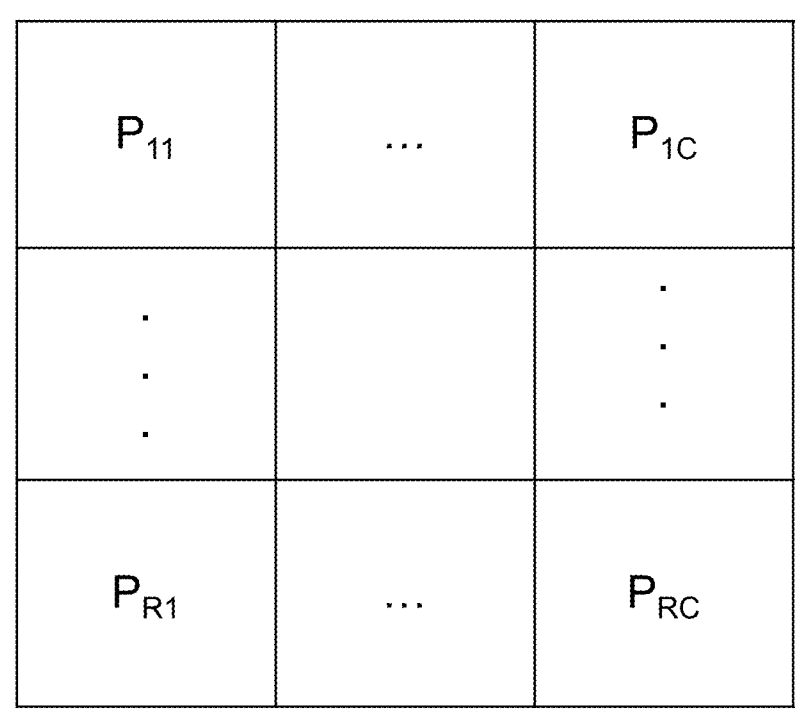

For each pixel in an image, the cloud transmittance calculation unit 12 unmixes the pixel to get a cloud abundance and calculates the cloud transmittance ($C_t$) by equation (3). Pixels with a non-zero cloud abundance are pixels which are affected by clouds (referred to as 'cloud pixels', hereinafter). If R and C are the number of rows and columns in the input image, respectively, an R×C transmission matrix will be such as shown in FIG. 3. In FIG. 3, $P_{11}, \ldots, P_{RC}$ represents matrix elements to store each of values.

Figure 4:
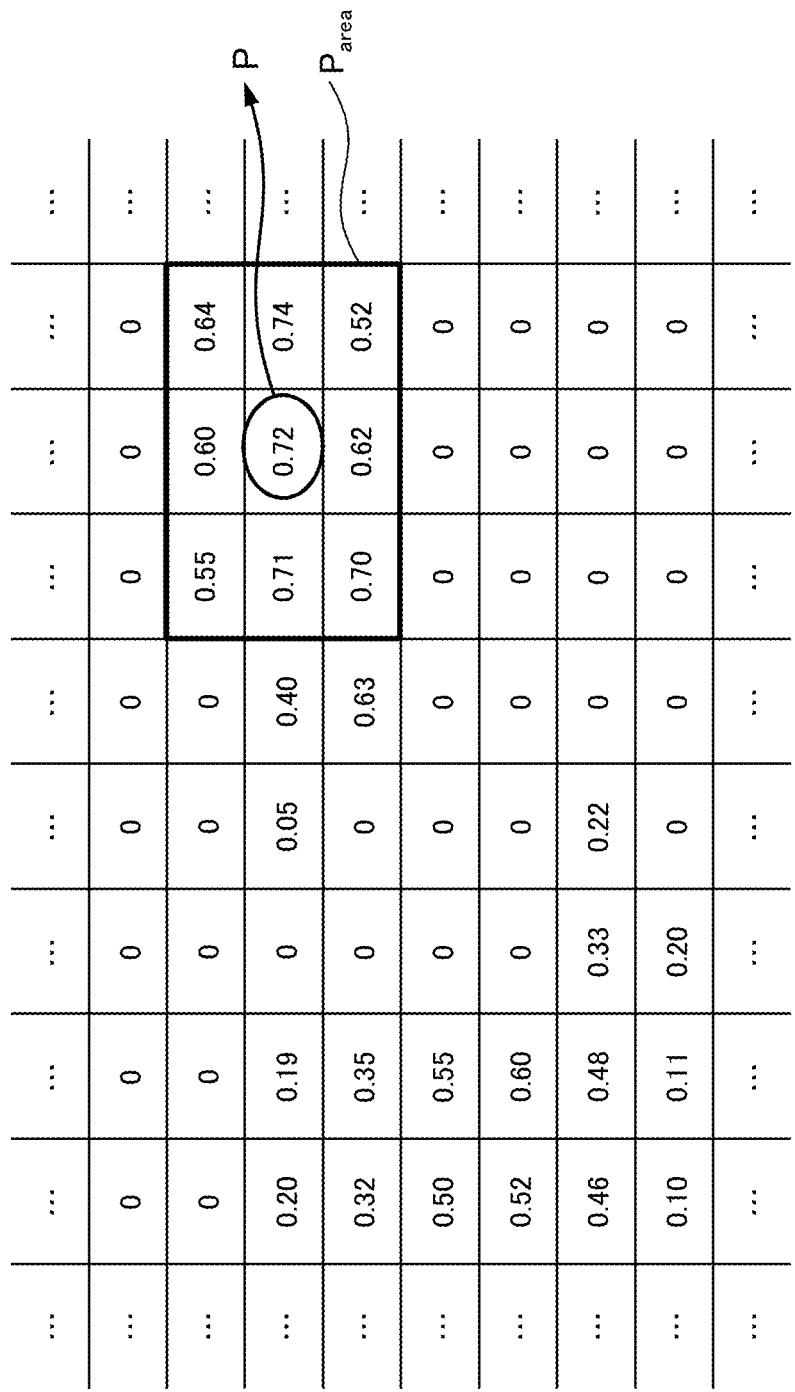
FIG. 4 is a subset of transmittance matrix in FIG. 3 depicting exemplary cloud transmittance values.

Cloud transmittance calculation unit 12 sets cloud abundance values for all pixels in the matrix, and sends it to the cloud classification unit 13. Cloud transmittance calculation unit 12 also sets cloud transmittance values in the matrix, and sends it to the attenuation factor estimation unit 16. FIG. 4 shows an example subset of R×C transmission matrix shown in FIG. 3. The area of pixel P and the neighborhood will be such as $P_{area}$ in FIG. 4.

Cloud classification unit 13 receives an input image from input unit 10 and cloud abundance values for all pixels from cloud transmittance calculation unit 12. Cloud classification unit 13 classifies each cloud pixel in the input image to one of the cloud classes, such as cirrocumulus, cirrostratus, altocumulus, stratocumulus, and stratus. Cloud classification unit 13 compares spectral signatures and examples of different cloud classes received from the cloud data storage 11 with a pixel spectrum in the input image for the classification. An input image may include a plurality of cloud classes. Cloud classification unit 13 labels each pixel with a cloud type label, and sends this label matrix to the cloud height estimation unit 14.

Cloud height estimation unit 14 receives the cloud type labels for cloud pixels and determines a height of each cloud pixel from the ground. Cloud height estimation unit 14 determines the estimated heights of each cloud pixel by using the look-up table retrieved from the cloud data storage 11. The look-up table has entries of atmospheric heights against cloud types (classes). Cloud height estimation unit 14 sends a matrix consisting of the estimated heights for cloud pixels to the shadow detection unit 15.

Shadow detection unit 15 receives the matrix consisting of the estimated heights for cloud pixels from cloud height estimation unit 14. Shadow detection unit 15 locates a shadow pixel corresponding to each cloud pixel based on a geometrical model (see FIG. 16) of an illumination source (sun) and a sensor (on a satellite). The geometric model is adopted from NPL 4. In context of the present invention, we assumed a nadir looking satellite. As a result, an image plane and a plane at the ground containing nadir projections of image pixels are exactly aligned and parallel. Therefore, a pixel in an image and its nadir projection will have the same coordinates for x and y axes. Using the geometrical model in NPL 4 with the nadir looking satellite condition, a location of a shadow pixel on a satellite image plane can be given as coordinate ($x_s$, $y_s$), and each value can be given as $$x_s = x_c - h_c \tan A_s \sin(B_s + D), \quad y_s = y_c - h_c \tan A_s \cos(B_s + D) \qquad (4)$$

where, ($x_s$, $y_s$) shows a shadow pixel formed by a cloud pixel ($x_c$, $y_c$), $h_c$ is a height of the cloud above the ground, $A_s$ is a solar zenith angle, $B_s$ is a solar azimuth angle measured clockwise from the true north, D is an angle between the y-axis and the true north to show a positional relationship between the true north and the satellite image including the y-axis, since the image has been taken independently of the direction. Shadow detection unit 15 plugs in the estimated height of the cloud pixel ($x_c$, $y_c$) for $h_c$ in equation (4) to locate the corresponding shadow pixel. Shadow detection unit 15 sends all pairs of shadow pixel coordinates and its corresponding cloud pixel coordinates in the input image to shadow removal unit 18.

Attenuation factor estimation unit 16 receives the matrix of cloud transmittance values from cloud transmittance calculation unit 12 and an input image from input unit 10. Attenuation factor estimation unit 16 calculates estimation of attenuation factors for the direct sun irradiance for all pixels in the input image. A cloud is a 3-dimentional entity and has various constituent molecules. As a result, incident radiation has multiple reflections, absorption and diffusion, along the path through the cloud.

Considering that the attenuation in the direct sun irradiance due to a cloud pixel ($x_c$, $y_c$) can be estimated by considering cloud transmittance not only at the pixel ($x_c$, $y_c$), but at its neighboring pixels as well, attenuation factor estimation unit 16 applies an averaging filter to the received cloud transmittance matrix. The averaging filter can be a simple filter or a special filter such as Mean filter, Gaussian blur (Gaussian smoothing) filter. To maintain the size of an input image after averaging, attenuation factor estimation unit 16 pads a number of rows and columns to the boundaries of the image, depending on the size of the averaging filter.

Figure 6:
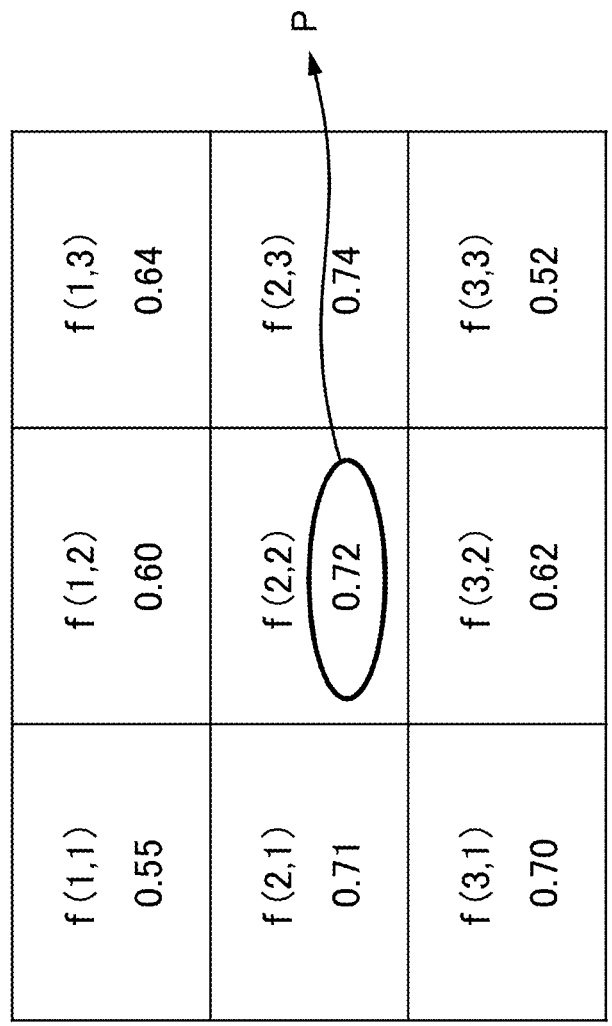
FIG. 6 is matrix showing neighborhood pixels of the pixel P in FIG. 4.

In this embodiment, as an example, a simple 3×3 averaging filter shown in FIG. 5 is used. The averaging filter has a center cell and neighbor cells around the center cell. All cells hold "1/9" and are denoted by such as $g(1,1)$, $g(1,2)$, . . . , $g(3,3)$. This averaging operation is for an average calculation of pixel values within a local window corresponding to all pixels, the calculated average is set in the center pixel. FIG. 6 shows a neighborhood pixels for the pixel P in FIG. 4 in the range of the averaging filter. All pixels are denoted by such as $f(1,1)$, $f(1,2)$, . . . , $f(3,3)$. An average $P_{av}$ for the center pixel P is a sum of multiplications of each pixel value $f(1,1)$, $f(1,2)$, . . . , $f(3,3)$ and filter value $g(1,1)$, $g(1,2)$, . . . , $g(3,3)$. In the range shown in FIG. 6, the average $P_{av}$ is calculated such as, $$\begin{aligned}P_{av} &= f(1, 1)^*g(1, 1) + f(1, 2)^*g(1, 2) +, \ldots , +f(3, 2)^*g(3, 2) + \\ &\quad f(3, 3)^*g(3, 3) \\ &= 0.55/9 + 0.60/9 + 0.64/9 + 0.71/9 + 0.72/9 + 0.74/9 + \\ &\quad 0.70/9 + 0.62/9 + 0.52/9 \\ &= (0.55 + 0.60 + 0.64 + 0.71 + 0.72 + 0.74 + 0.70 + 0.62 + \\ &\quad 0.52)/9 = 0.64\end{aligned}$$

Attenuation factor estimation unit 16 calculates an average $P_{av}$ for each pixel. As a result of the calculation for all pixels, a matrix as shown in FIG. 7 is obtained from cloud transmittance values in FIG. 4. Values in the matrix in FIG. 7 shows attenuation factors for the direct sun irradiance for respective pixels.

Attenuation factor estimation unit 16 sends the averaged cloud transmittance matrix which is a matrix consisting attenuation factors for the direct sun irradiance, to the shadow removal unit 18.

Atmosphere modelling unit 17 receives an input image from input unit 10, and models the atmosphere at the time of capturing the image by established atmospheric models such as MODTRAN (MODerate resolution atmospheric TRANsmission, Registered Mark), ATCOR (Atmospheric & Topographic Correction, Registered Mark). These models consider the time of capturing, the geographical location of the image, seasonal attributes etc. and derive atmospheric parameters needed for removing shadows. For example, atmosphere modelling unit 17 can obtain atmospheric parameters, such as $L_p$, $E_{dir}$, $E_{dif}$, $t_v$ in equation (2).

Shadow removal unit 18 receives all pairs of a cloud pixel coordinates and corresponding a shadow pixel coordinates in an image plane from the shadow detection unit 15. Shadow removal unit 18 also receives attenuation factors for the direct sun irradiance from the attenuation factor estimation unit 16 and the derived atmospheric parameters from atmosphere modelling unit 17. For each pair of a cloud ($x_c$, $y_c$) and the shadow pixel ($x_s$, $y_s$), shadow removal unit 18 corrects the shadow pixel based on a physical model of a cloud shadow formation, by employing the derived attenuation factors. For example, the shadow removal unit 18 can plug in the attenuation factor of the direct sun irradiance at the pixel ($x_c$, $y_c$) for $t_s$ in equation (2) to correct the shadow pixel ($x_s$, $y_s$). Along with $t_s$, shadow removal unit 18 can plug in values for other atmospheric parameters for $L_p$, $E_{dir}$, $E_{dif}$ and $t_v$ in the equation (2).

Shadow removal unit 18 sends a multispectral image corrected for the shadow removal to the output unit 19.

Output unit 19 sends the received corrected image from the shadow removal unit 18 to an external device such as a display (not shown in FIG. 1).

Operation of Image Processing Device

Figure 8:
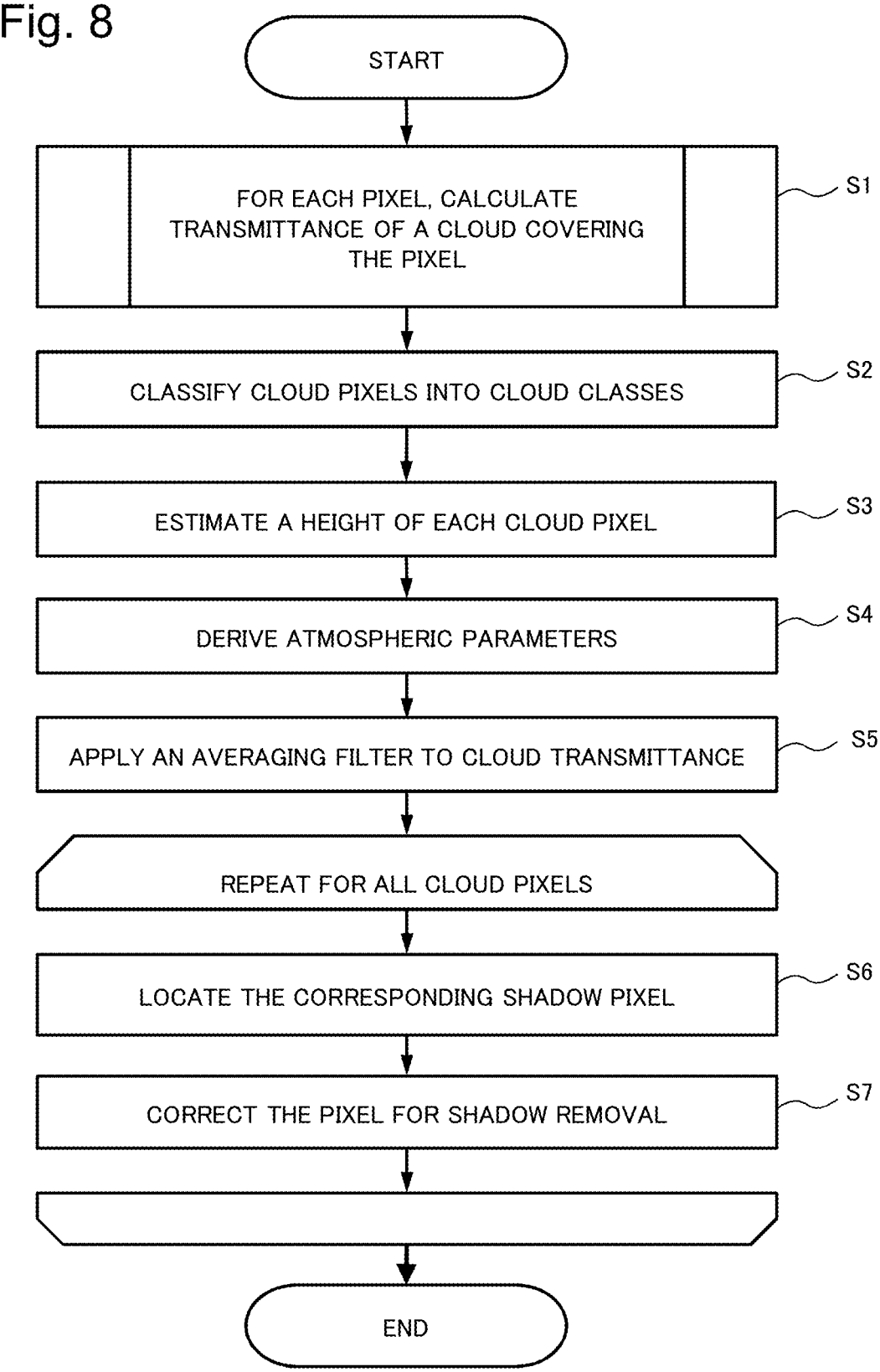
FIG. 8 is a flow chart of the procedure of the first example embodiment in accordance with the present invention.

FIG. 8 shows a flowchart which depicts the operation of the image processing device 100, assuming that required domain knowledge about clouds is stored in the cloud data storage 11.

In the step S1, for each pixel in an image acquired by input unit 10, cloud transmittance calculation unit 12 calculates transmittance of a cloud ($C_t$). Pixels with non-zero cloud transmittance values are referred to as cloud pixels. This operation will be described in detail later. Cloud transmittance calculation unit 12 also calculates abundance of the cloud for each pixel in the input image. Cloud transmittance calculation unit 12 sends the transmittance of the cloud to attenuation factor estimation unit 16, and sends the abundance of the cloud to cloud classification unit 13.

In the step S2, cloud classification unit 13 classifies each cloud pixel in the input image to a particular cloud class by comparing its spectral response and domain knowledge such as a look-up table stored in cloud data storage 11. Cloud classification unit 13 can use any supervised classification technique, for example, however not limited to, nearest neighbor, decision trees, spectral angle mapper, K-nearest neighborhood, support vector machines, artificial neural networks, convolutional neural networks, and deep neural networks. Cloud classification unit 13 can use spectral signatures and examples received from the cloud data storage 11 to train a supervised classifier.

In the step S3, cloud height estimation unit 14 estimates a height of each cloud pixel. More specifically, cloud height estimation unit 14 determines a height of each cloud pixel above the ground by using a look-up table in the cloud data storage 11.

In the step S4, atmosphere modelling unit 17 derives atmospheric parameters. More specifically, atmosphere modelling unit 17 models the atmosphere at the time of capturing the input image and obtains values for atmospheric parameters. For example, atmosphere modelling unit 17 can make use of established atmospheric models such as MODTRAN (Registered Mark), and ATCOR (Registered Mark) to derive atmospheric parameters, such as $L_p$, $E_{dir}$, $E_{dif}$, $t_v$ for equation (2). Atmosphere modelling unit 17 sends the atmospheric parameters to shadow removal unit 18.

In the step S5, attenuation factor estimation unit 16 applies an averaging filter to transmittance of a cloud cover (cloud transmittance). For example, attenuation factor estimation unit 16 filters a cloud transmittance matrix to estimate attenuation factors for the direct sun irradiance due to clouds.

Steps S6 and S7 are executed for all cloud pixels. In the step S6, for a cloud pixel, shadow detection unit 15 locates the corresponding shadow pixel based on the geometric model in equation (4) by employing the estimated height by the cloud height estimation unit 14.

In the step S7, shadow removal unit 18 corrects the located shadow pixel for shadow removal. More specifically, shadow removal unit 18 corrects the located shadow pixel by plugging in the derived attenuation factors of the direct sun irradiance for $t_s$ and other parameters obtained by the step S4 in equation (2).

This is the end of the operation of the image processing device 100.

Figure 9:
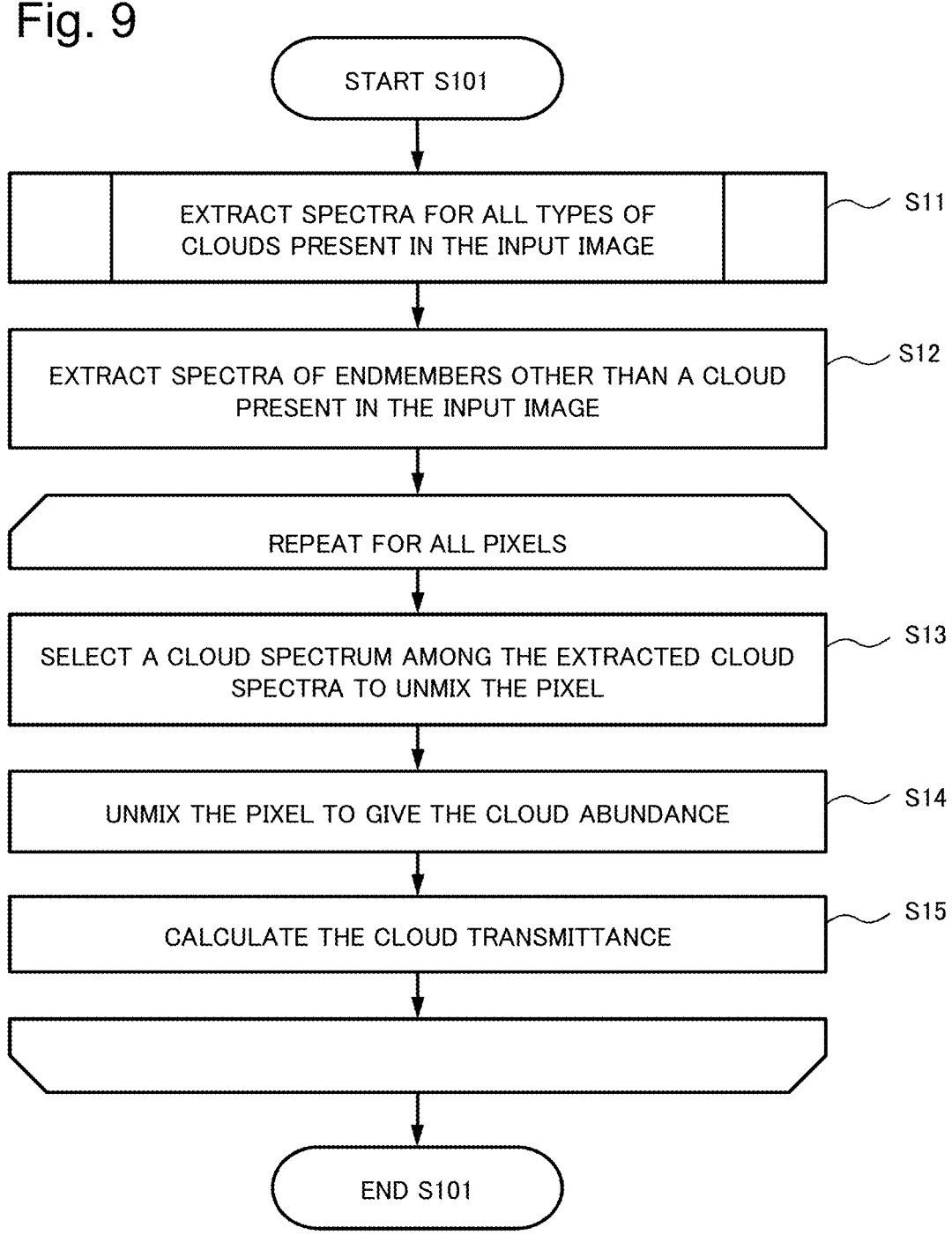
FIG. 9 is a flow chart for the procedure of the step S1 in FIG. 8.

Next, the operation of the step S1 mentioned above will be described in detail. FIG. 9 shows a flowchart of the operation of the step S1.

Firstly, in the step S11, cloud transmittance calculation unit 12 extracts spectra of all type of clouds present in the input multispectral image. The operation will be described in detail later.

In the step S12, cloud transmittance calculation unit 12 extracts spectra of endmembers other than a cloud in the input image, the maximum number of endmembers other than a cloud is automatically restricted to a number two less than L due to constrains in the existing method. L is the number of wavelength bands present in an input image.

If representative pixels are identified for an endmember in the image, a mean spectrum of representative pixels can be taken as an endmember spectrum. However, generally, such representative pixels are not easily available. Alternatively, cloud transmittance calculation unit 12 can perform the extraction by the well-known unsupervised endmember extraction algorithms such as Pixel Purity Index, N-FINDR, and Vertex Component Analysis (VCA). Alternatively, cloud transmittance calculation unit 12 can perform the extraction by first using an unsupervised clustering algorithm to cluster spectrally similar pixels. Then, cloud transmittance calculation unit 12 selects endmember spectra as means of respective clusters and considers only those spectra which are not similar to cloud spectra.

Steps S13 to S15 are executed for all pixels in an image.

In the step S13, for a pixel, cloud transmittance calculation unit 12 selects a cloud spectrum among the extracted cloud spectra to unmix the pixel. The selection can be based on a spatial or spectral proximity measure for a cloud spectrum and a pixel spectrum. A purpose of this process is to select a cloud spectrum which most probably has mixed with the pixel spectrum.

In the step S14, cloud transmittance calculation unit 12 unmixes the pixel to give the cloud abundance. More specifically, cloud transmittance calculation unit 12 determines fractional abundances of all endmembers along with a cloud in the pixel. For a pixel spectrum, cloud transmittance calculation unit 12 determines coefficients of a linear mixture of endmembers spectra and the cloud spectrum by an iterative least square approach: the fully constrained linear mixture analysis. The coefficients of the linear mixture model are fractional abundances of the endmembers and the cloud. Cloud transmittance calculation unit 12 unmixes the given spectrum such that if the endmembers spectra and the cloud spectrum are scaled by the respective calculated fractional abundances and added linearly, then the given spectrum is obtained. Based on the above description, cloud transmittance calculation unit 12 obtains a fractional abundance of a cloud, that is, g (relative thickness factor of a cloud).

After calculating the cloud abundance, in the step S15, cloud transmittance calculation unit 12 calculates the cloud transmittance for each pixel by equation (3).

The explanation of the specific operation of the step S1 ends here.

Figure 10:
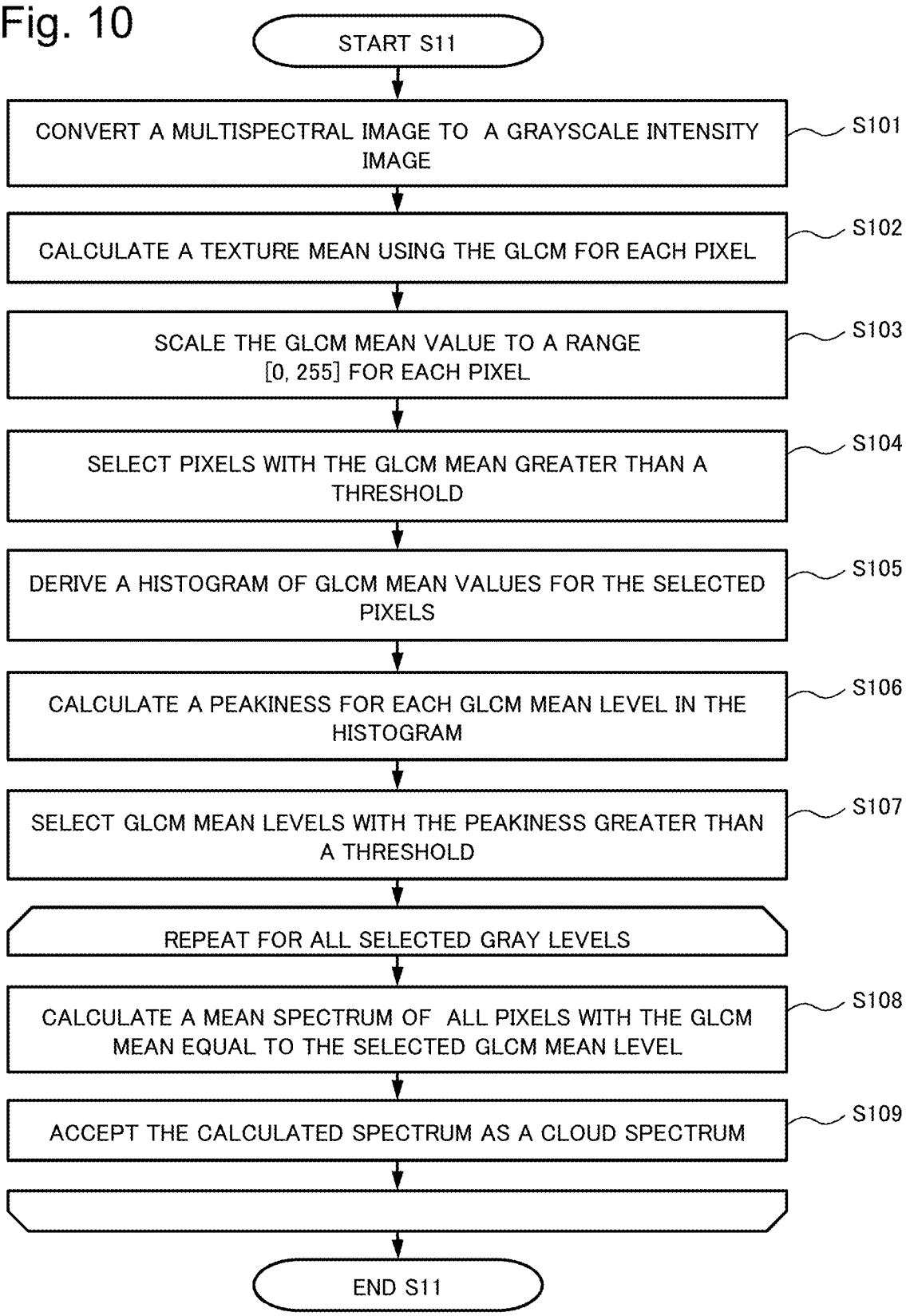
FIG. 10 is a flow chart for the procedure of the step S11 in FIG. 9.

Next, the operation of the step S11 mentioned above will be described in detail. FIG. 10 shows a flowchart of the operation in the step S11. Firstly, in the step S101, cloud transmittance calculation unit 12 converts the received multi spectral image (I) to a grayscale intensity image ($I_m$) by equation (5), wherein for i=1, ..., R. j=1, ..., C. (k is a variable corresponding to wavelength bands in an input image)

$$I_m(i, j) = \sum_{k=1}^{L} I(i, j, k) \qquad (5)$$

In the step S102, cloud transmittance calculation unit 12 calculates a texture measure (texture mean) to detect pixels potentially affected by clouds. Texture of an image can be evaluated by the Gray-Level Co-occurrence Matrix (GLCM). Different quantities can be derived from the GLCM such as entropy, contrast, variance and mean. The most preferred measure is a GLCM mean. From the grayscale intensity image, cloud transmittance calculation unit 12 calculates a texture mean using the GLCM (a GLCM mean value) within a local window for each pixel in the image. The detailed description of the step S102 follows next.

For a pixel, within a local window, to derive the GLCM, cloud transmittance calculation unit 12 generates the co-occurrence matrix whose elements are frequency $P_\delta$ (i, j) (i=0, 1 ... Q−1, j=0, 1 ... Q−1) of occurrence of intensity levels i and j in the window at a certain displacement δ=(s, θ). Q is the maximum value of quantized intensity levels. s is a distance between pixels with intensity levels i and j, θ is an orientation of a line joining the intensity levels i and j in an image with respect to the horizontal axis. Feature values are calculated from the derived GLCM matrix, and feature information (such as texture) of an image is characterized by these values.

To determine the GLCM, a quantization of input intensity levels is recommended to avoid sparse GLCM with many zeroes. Quantization levels (Q) can vary from 2 to the intensity levels in the input image. The most preferred is an 8-level quantization. i and j correspond to the Q-level quantized intensity levels in the window. From the derived GLCM, a GLCM mean ($G_{mean}$) is calculated such as $$G_{mean} = \sum_{i,j=0}^{Q-1} i \times P(i, j) \qquad (6)$$

where P(i,j) indicates a value for intensity levels i and j in the derived GLCM. It indicates how often a pair of intensity level i and intensity level j has occurred in a particular orientation at a particular distance in the window. For example, an element at (7, 2) in the derived GLCM shows how many times intensity levels 7 and 2 have occurred together in the quantized local window around the pixel.

The orientation can be taken as a horizontal (0°), a vertical (90°), a diagonal1 (45°) or a diagonal2 (135°). The most preferred orientation is the horizontal (0°) one with a unit distance between intensity levels.

In the step S103, cloud transmittance calculation unit 12 scales the GLCM mean values of all pixels to a range [0,255].

In the step S104, cloud transmittance calculation unit 12 selects pixels with a GLCM value greater than a predetermined threshold as pixels potentially affected by clouds. An average GLCM mean over an image serves well as the threshold for most of images.

In the step S105, cloud transmittance calculation unit 12 derives a histogram of GLCM mean values for pixels selected in the step S104.

In the step S106, cloud transmittance calculation unit 12 calculates a peakiness for each GLCM mean level peak in the histogram as $$\text{Peakiness} = \left(1 - \frac{V_a + V_b}{2P}\right)\left(1 - \frac{1}{Q \times P}\right) \quad (7)$$

where "$V_a$" is a height of the nearest valley before the peak, "$V_b$" is a height of the nearest valley after the peak, P is a height of the peak, Q is a spread of the peak, which is taken as a distance between adjacent valleys of the peak. In context of the given problem, a histogram of GLCM mean values is sparse with zeroes for many levels. Therefore, for calculating the peakiness, adjacent non-zero valleys are considered.

In the step S107, cloud transmittance calculation unit 12 selects GLCM mean levels in the histogram for which the peakiness is greater than a predetermined threshold.

Steps S108 and S109 are executed for all selected GLCM mean levels.

In the step S108, for a selected GLCM mean level, cloud transmittance calculation unit 12 calculates a mean spectrum of all pixels with the GLCM mean equal to the selected GLCM mean level. In the step S109, cloud transmittance calculation unit 12 accepts the calculated mean spectrum as a cloud spectrum present in an input image. The final output of the operation in the step 109 is a set of cloud spectra present in an input image.

The specific operation of cloud transmittance calculation unit 12 and the step S11 ends here.

There can be alternatives for some of steps described above in the processes of the first example embodiment in accordance with the present invention.

For example, in the process of the step S1 in FIG. 8, the cloud transmittance calculation unit 12 can derive a gray scale intensity image from the input multispectral image in the step S101 of FIG. 10 by a weighted averaging operation instead of equation (5) while the weights being decided by the spectral characteristics of the skylight.

Effect of First Example Embodiment

Figure 19:
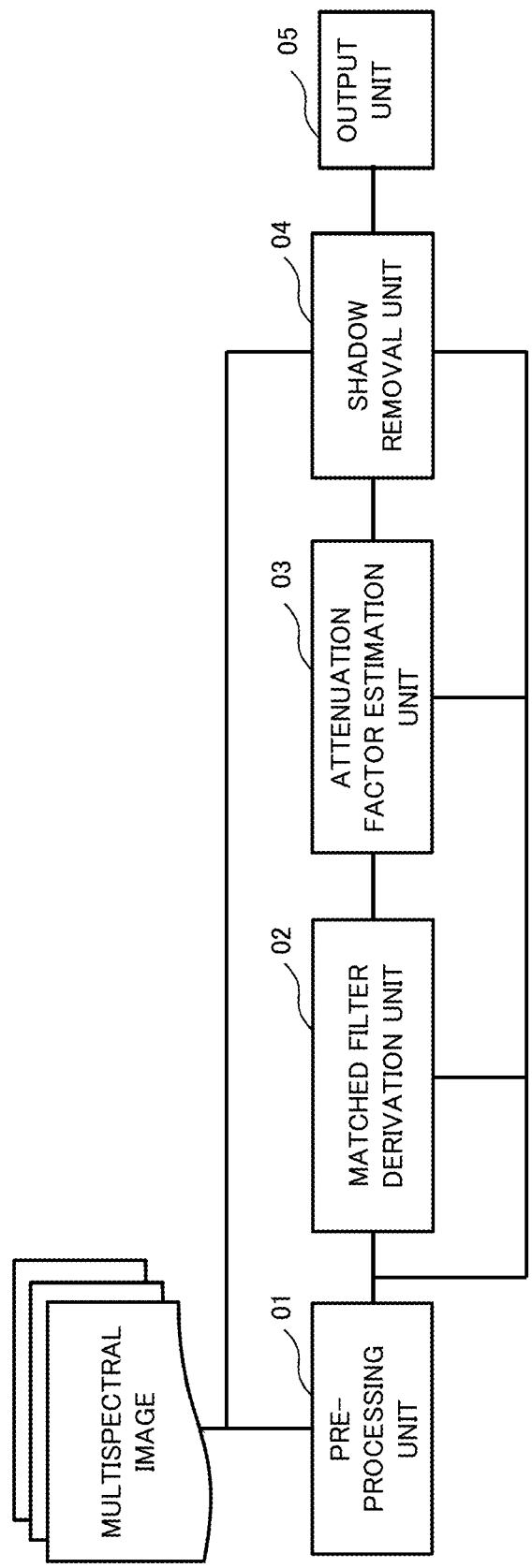
FIG. 19 is a block diagram of the method described in NPL 1.

Image processing device 100 of the first example embodiment in accordance with the present invention can accurately detect pixels covered by cloud shadows and remove effects of the cloud shadows in an image. The reason is that cloud transmittance calculation unit 12 calculates cloud transmittance values for the cloud shadow removal and attenuation factor estimation unit 16 takes into account a physical model of shadow formation and estimates the attenuation factors for the direct sun irradiance from the optical properties (cloud transmittance) of the occluding cloud. In addition, a cloud shadow is correctly located by shadow detection unit 15 using the domain knowledge in the cloud data storage 11. The processes in attenuation factor estimation unit 16 avoid calculations of covariance matrices which make the method of NPL 1 computationally complex. In addition, image processing device 100 doesn't need to detect water pixels for the shadow removal, which is advantageous because the method in the prior art NPL 1 is very sensitive to the exclusion of water pixels. If pre-processing unit 01 in FIG. 19 can't detect water pixels correctly, which is often the case, then the method performs overcorrection for shadow pixels. This problem is alleviated by the image processing device 100 since no processes in image processing device 100 needs the removal of water pixels. As a combined result, image processing device 100 can detect and correct shadows of clouds with more accuracy.

Second Example Embodiment

In the first example embodiment, image processing device 100 is capable of detecting pixels covered with cloud shadows and correcting them to retrieve the true ground reflectance accurately by using optical properties of the occluding cloud. The accuracy of the detection and the correction can be improved further by estimating a height of a cloud in an input image from the input image itself. In an image, to correct a shadow pixel cast by a cloud based on the cloud's optical properties, establishing an exact correspondence between the shadow pixel and the pixel of the occluding cloud is necessary. The correspondence will be accurate only if the estimation for a height of the occluding cloud is correct. In the second embodiment, an image processing device which can find a height of the occluding cloud in an image from the image itself without domain knowledge is described.

Image Processing Device

Figure 11:
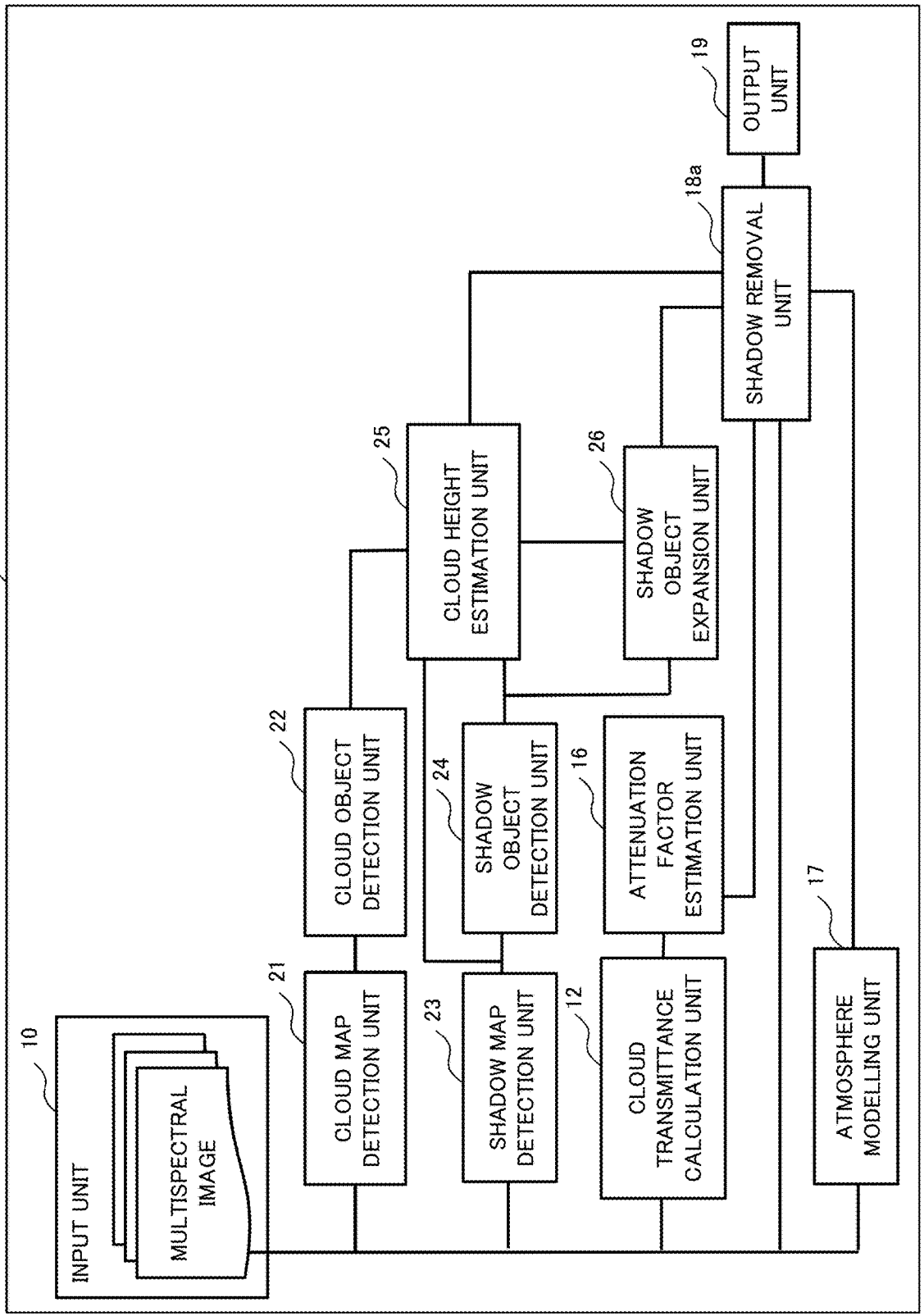
FIG. 11 is a block diagram of the second example embodiment in accordance with the present invention.

FIG. 11 is a block diagram showing the configuration of image processing device 200 of the second example embodiment in accordance with the present invention. Image processing device 200 includes: input unit 10, cloud map detection unit 21, cloud object detection unit 22, shadow map detection unit 23, shadow object detection unit 24, cloud height estimation unit 25, shadow object expansion unit 26, cloud transmittance calculation unit 12, attenuation factor estimation unit 16, atmosphere modelling unit 17, shadow removal unit 18a and output unit 19.

Cloud map detection unit 21 detects cloud pixels in an input image which is received from input unit 10 based on spatial and spectral properties, namely, a cloud covers a wide spread area in an image with a homogeneous texture and shows high reflectance over a wide range of wavelengths from visible to mid-infrared bands. Cloud map detection unit 21 can evaluate these properties with a texture measure by employing GLCM mean. Alternatively, cloud map detection unit 21 can identify the intensity level flatness based on measures such as edges per unit length, spatial variance.

Cloud map detection unit 21 can design a filter to detect areas with no sudden change of intensity levels based on intensity level gradient values. The gradient values can be calculated by an application of a filter function such as Prewitt, Sobel, Laplacian of Gaussian or Canny edge detector. Alternatively, a standard deviation can be used as a measure of the intensity gradient. Furthermore, cloud map detection unit 21 can employ filters of a shape and/or filters for a specific land cover class based on spectral reflectance properties of the particular land cover class.

Unlike clouds, manmade objects have well-defined regular shapes. Cloud map detection unit 21 can determine shapes of objects in the input image and remove objects with regular shapes from the estimated cloud map.

In addition to the removal of regular shapes, the cloud map detection unit 21 can evaluate the specific land cover classes such as vegetation, snow, water, built up areas in the input image. For the evaluation, cloud map detection unit 21 can employ spectral indices, for example, however not limited to, normalized difference vegetation index, normalized difference snow index, normalized built-up difference index, normalized difference water index, normalized difference mud index and normalized burn ratio.

Cloud map detection unit 21 employs a combination of properties and filters mentioned above to detect cloud pixels. Cloud map detection unit 21 creates a cloud map containing information about cloud pixels. For example, the cloud map can be a matrix consisting of a probability for each pixel belonging to the set of cloud pixels or it can be a binary matrix with a value '1' for the detected cloud pixels and a value '0' for others. Cloud map detection unit 21 sends the cloud map to cloud object detection unit 22.

Cloud object detection unit 22 receives a cloud map from cloud map detection unit 21 and finds connected pixels in the map. A group of connected pixels form an object in an image. Each object in the cloud map corresponds to a cloud in the input image. A purpose for the process of cloud object detection unit 22 is to identify clouds in the input image as individual objects.

Cloud object detection unit 22 can use 4-connectivity or 8-connectivity of pixels to find the connected pixels. A pixel connectivity is the way in which pixels relate to their neighbors. The 4-connected pixels are neighbors to every pixel that touches one of their edges. These pixels are connected horizontally and vertically. The 8-connected pixels are neighbors to every pixel that touches one of their corners or edges. These pixels are connected horizontally, vertically, and diagonally. The most preferred connectivity is the 8-connectivity of pixels.

Alternatively, cloud object detection unit 22 can find out cloud objects by a region growing technique after defining a seed for each cloud object.

Cloud object detection unit 22 assigns a label to each of the found cloud objects. Cloud object detection unit 22 labels all cloud pixels in the cloud map with a label of a cloud object to which they belong. Cloud object detection unit 22 sends the labelled cloud object map to cloud height estimation unit 25.

Shadow map detection unit 23 receives an input image from input unit 10 and detects pixels which are covered by cloud shadows. Shadows which are formed due to clouds exhibit similar spatial properties as the occluding clouds, for example, shape, texture, and variance. Consequently, properties and filters explained for cloud map detection unit 21 can be applied to detect a shadow map as well. However, spectral responses in shadow areas are low.

In a grayscale intensity image, shadow pixels appear dark while cloud pixels are bright. Therefore, shadow map detection unit 23 complements the grayscale intensity image obtained from the input multispectral image. The complement operation makes dark objects bright and vice versa. Then shadow map detection unit 23 can perform the similar operation as cloud map detection unit 21 and detect pixels beneath shadows (referred to as "shadow pixels", hereinafter).

After detecting shadow pixels, shadow map detection unit 23 creates a shadow map containing information about shadow pixels. For example, the shadow map can be a matrix consisting of a probability for each pixel belonging to the set of shadow pixels or it can be a binary matrix with a value '1' for the detected shadow pixels and a value '0' for others. Shadow map detection unit 23 sends the shadow map to shadow object detection unit 24.

Shadow object detection unit 24 receives the shadow map from shadow map detection unit 23. An operation of shadow object detection unit 24 is similar to cloud object detection unit 22. Both receive a map as an input and find connected objects in the input. The difference between the inputs for shadow object detection unit 24 and cloud object detection unit 22 is that the former is a shadow map and the latter is a cloud map.

Shadow object detection unit 24 labels all shadow pixels in the shadow map with a label of a shadow object to which they belong. Shadow object detection unit 24 sends the labelled shadow object map to cloud height estimation unit 25.

Cloud height estimation unit 25 receives a cloud object map from cloud object detection unit 22, a shadow map from shadow map detection unit 23 and a shadow object map from shadow object detection unit 24. Cloud height estimation unit 25 calculates estimation of heights for all cloud objects based on the above inputs.

Cloud height estimation unit 25 finds a cloud-shadow pair based on facts that a shadow is formed in a particular direction for an image and a cloud shadow has similar shape to the occluding cloud. Cloud height estimation unit 25 increments a cloud height from the minimum to the maximum of a range for possible cloud heights in unit steps, and finds an estimated location for a shadow based on the geometric model in equation (4).

Cloud height estimation unit 25 shifts a cloud object to each estimated location and calculates an overlap between the shifted cloud object and the shadow map. Cloud height estimation unit 25 selects a location at which the overlap is maximum as the location of the matched shadow for the cloud. Cloud height estimation unit 25 accepts a height at which the matched shadow is found as a height of the occluding cloud for the shadow.

Cloud height estimation unit 25 finds a shadow objects to which the matched shadow belongs, and stores the found height of the occluding cloud for it. Cloud height estimation unit 25 sends the matched shadow object map to shadow object expansion unit 26.

The matched shadow object map has shadow objects found to be matching with any one of the cloud objects. In addition, cloud height estimation unit 25 sends the estimated heights for the occluding cloud objects to shadow removal unit 18a.

Shadow object expansion unit 26 receives a matched shadow object map from cloud height estimation unit 25. Shadow object expansion unit 26 expands (increases) an area of shadow objects in the map spatially so as to include shadow edges. Shadow object expansion unit 26 can employ the morphological dilation operation.

Shadow removal unit 18a receives an input image, a shadow object map to be corrected from shadow object expansion unit 26, height estimates of the occluding clouds from cloud height estimation unit 25, attenuation factors for the direct sun irradiance from attenuation factor estimation unit 16 and atmospheric parameters from atmosphere modelling unit 17.

For each pixel in a shadow object, shadow removal unit 18*a* finds the corresponding cloud pixel by plugging in the estimated height of the occluding cloud (for the shadow object) for $h_c$ in equation (4). Using the attenuation factor for the found cloud pixel, the shadow pixel is corrected based on a physical model of a cloud shadow formation, such as a model in equation (1).

Other units are the same as the first example embodiment.

Operation of Image Processing Device

Figure 12:
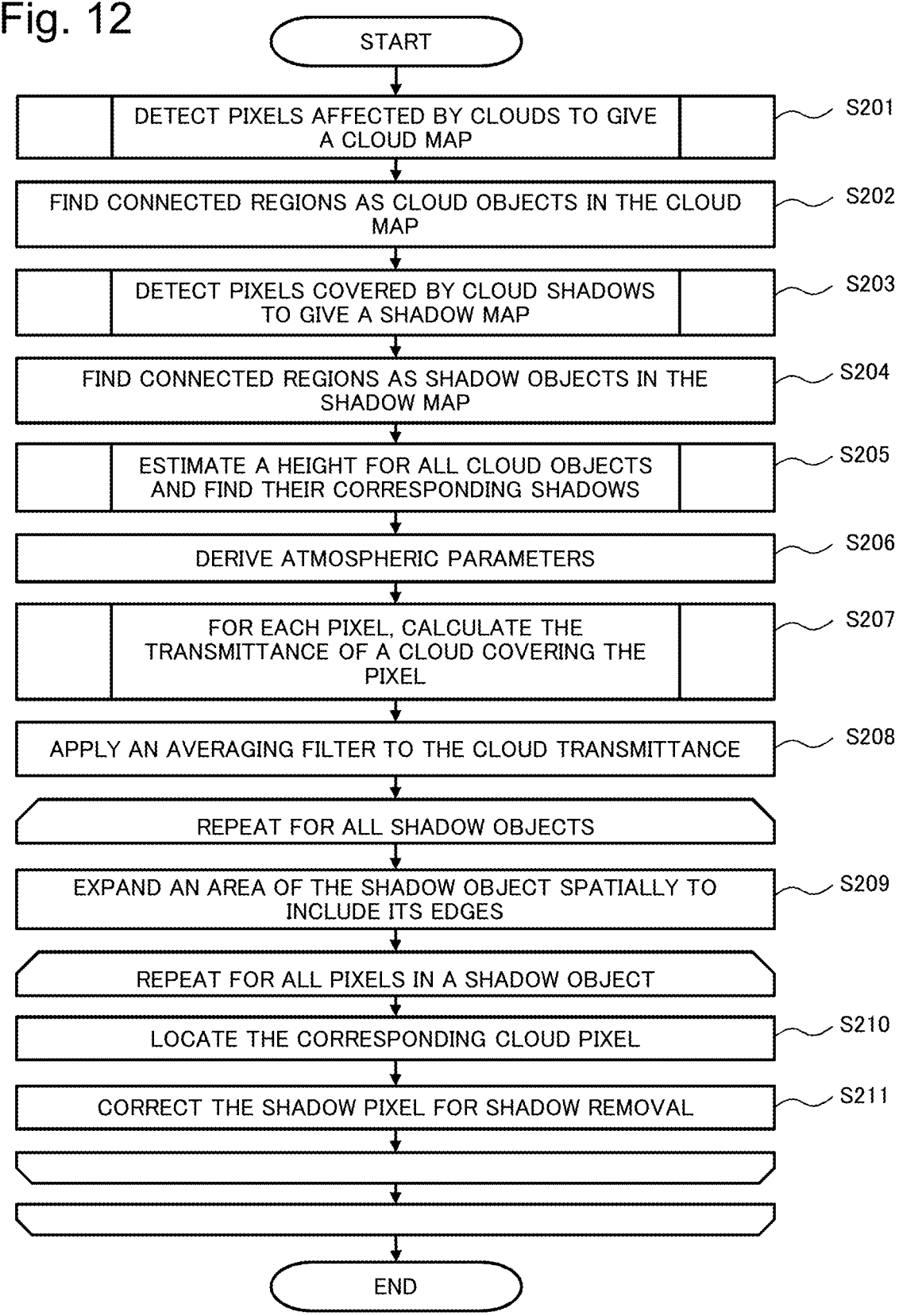
FIG. 12 is a flow chart of the second example embodiment in accordance with the present invention.

FIG. 12 shows a flowchart which depicts the operation of image processing device 200.

At first, in the step S201, cloud map detection unit 21 receives an input image from input unit 10, and detects pixels affected by clouds (cloud pixels) in the input image to give a cloud map. The operation will be described in detail later.

In the step S202, cloud object detection unit 22 finds connected regions as cloud objects in the cloud map using the 8-connectivity of pixels to give individual cloud objects in the image, and labels each cloud pixel with a label of a cloud object to which it belongs. Starting from a single unlabeled cloud pixel, cloud object detection unit 22 includes 8-connected neighbors of the pixel to one object. The inclusion process continues till all 8-connected unlabeled neighbors of pixels in an object are included in the same object. After completion of the inclusion process, one cloud object is found. Then the next unlabeled cloud pixel defines the next cloud object in an image and the process continues till all cloud pixels receive their cloud object label.

In the step S203, shadow map detection unit 23 detects pixels covered by cloud shadows (shadow pixels) in the input image to get a shadow map. The operation will be described in detail later.

In the step S204, shadow object detection unit 24 finds connected regions as shadow objects in the shadow map to give individual shadow objects. The operation of the step S204 is the same as that of the step S202.

In the step S205, cloud height estimation unit 25 finds heights of all cloud objects and locates their corresponding shadows. The operation will be described in detail later.

The operation of the step S206 is the same as that of the step S4 in FIG. 8. The operation of the step S207 is the same as that of the step S1 in FIG. 8. The operation of the step S208 is the same as that of the step S5 in FIG. 8. Steps S209 to S211 are executed for all shadow objects.

In the step S209, shadow object expansion unit 26, expands (increases) an area of shadow objects spatially so as to include shadow edges by the grayscale morphological dilation operation. A morphological dilation operation expands bright shapes in an input image. The grayscale morphological dilation is defined as shown below.

$$[I \oplus H](u, v) = \max_{(i,j) \in H} \{I(u+i, v+j) + H(i, j)\} \quad (8)$$

where I is an input gray scale intensity image, H is a structuring element, (u, v) are pixel coordinates in the image I, (i, j) are coordinates in the structuring element H. A structuring element is a shape used to probe a given image for performing morphological operations. Any suitable structuring element can be used. In the present embodiment, a disk shaped structuring element is employed.

Steps S210 and S211 are executed for all pixels in a shadow object. If there are multiple shadow objects in an input image, the steps S210 and S211 are repeated for the number of the shadow objects.

In the step S210, for a shadow pixel, shadow removal unit 18*a* locates the corresponding cloud pixel. More specifically, shadow removal unit 18*a* checks a shadow object to which the pixel belongs. Shadow removal unit 18*a* substitutes a height estimated for the occluding cloud corresponding to the shadow object as $h_c$ in equation (4) to find the corresponding cloud pixel and its attenuation factor.

In the step S211, shadow removal unit 18*a* corrects pixels of the shadow object (shadow pixels) for shadow removal. More specifically, shadow removal unit 18*a* plugs in the attenuation factor $h_c$ obtained in the step S210 for attenuation factor $t_s$ and other atmospheric parameters obtained in the step S206 in equation (1) to correct the shadow pixels.

This is the end of the operation of image processing device 200.

Figure 13:
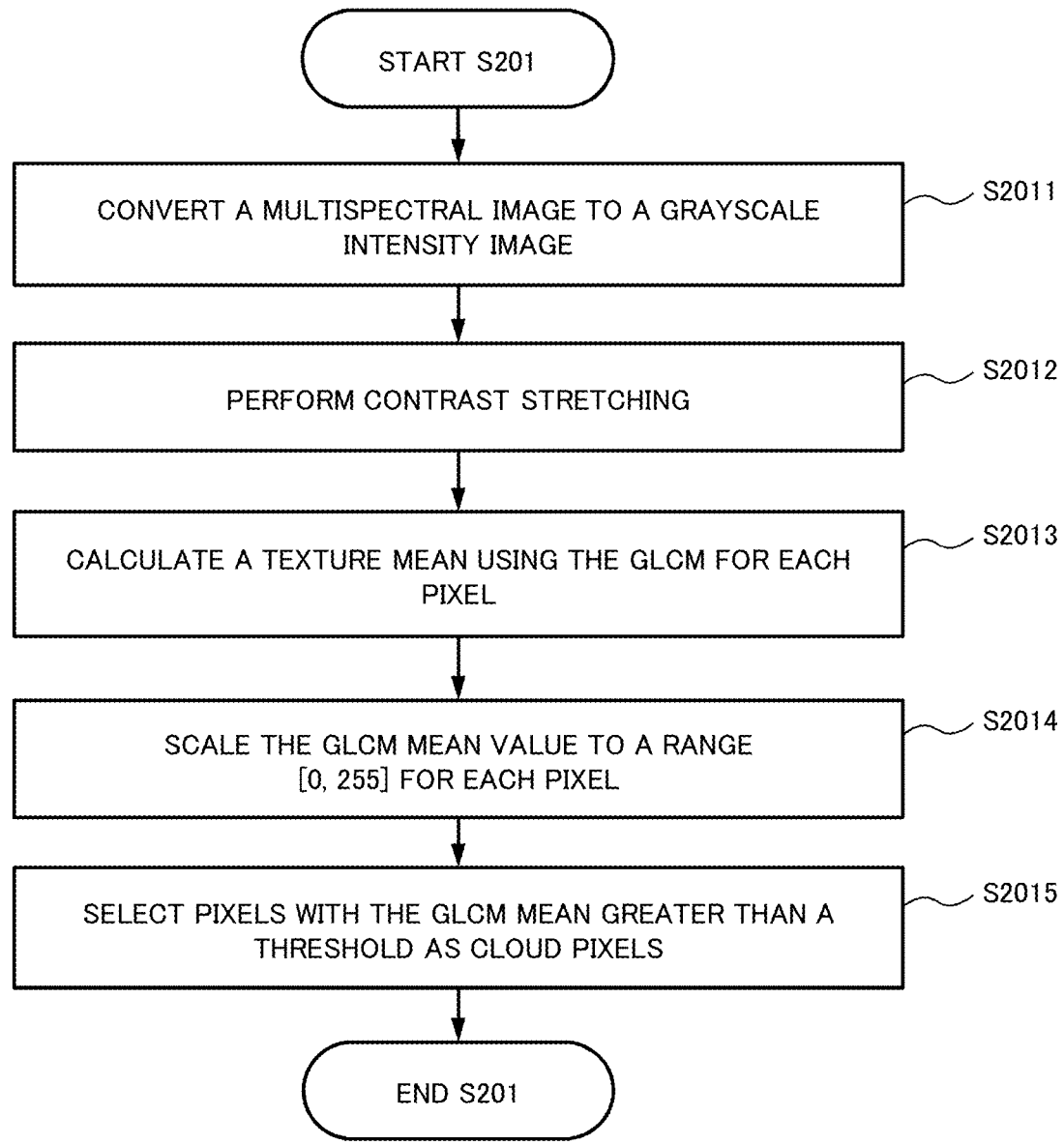
FIG. 13 is a flow chart of the procedure of the step S201 in FIG. 12.

Next, the operation of the step S201 mentioned above will be described in detail. FIG. 13 shows a flowchart of the operation in the step S201.

The operation of the step S2011 is the same as that of the step S101 in FIG. 10.

In the step S2012, cloud map detection unit 21 performs a contrast stretching operation so as to make dark objects darker and bright objects brighter. The contrast stretching improves the distinction of clouds from the background.

The operation of steps S2013 to S2015 is the same as those of steps S102 to S104 in FIG. 10, respectively.

This is the end of the operation of the step S201 in FIG. 12.

Figure 14:
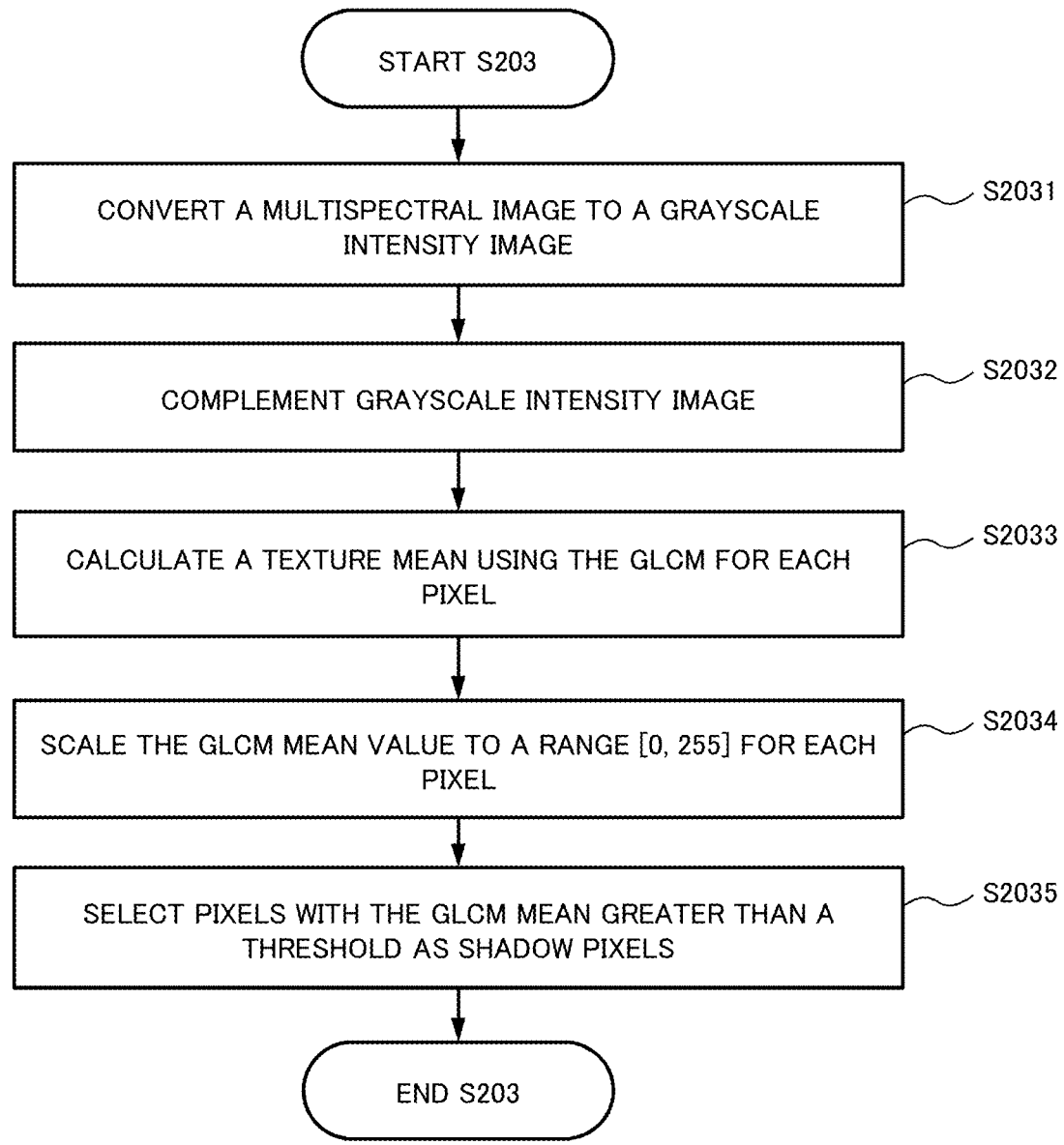
FIG. 14 is a flow chart for the procedure of the step S203 in FIG. 12.

Next, the operation of the step S203 in FIG. 12 mentioned above will be described in detail. FIG. 14 shows a flowchart of the operation in the step S203.

The operation of the step S2031 is the same as that of the step S101 in FIG. 10.

In the step S2032, shadow map detection unit 23 complements the grayscale intensity image so as to make dark objects bright and vice-versa. For example, subtracting intensity levels in an image from the maximum possible intensity level for the image can give a complement of the image.

The operation of steps S2033 to S2035 is the same as those of steps S102 to S104 in FIG. 10, respectively.

This is the end of the operation of the step S203 in FIG. 12.

Figure 15:
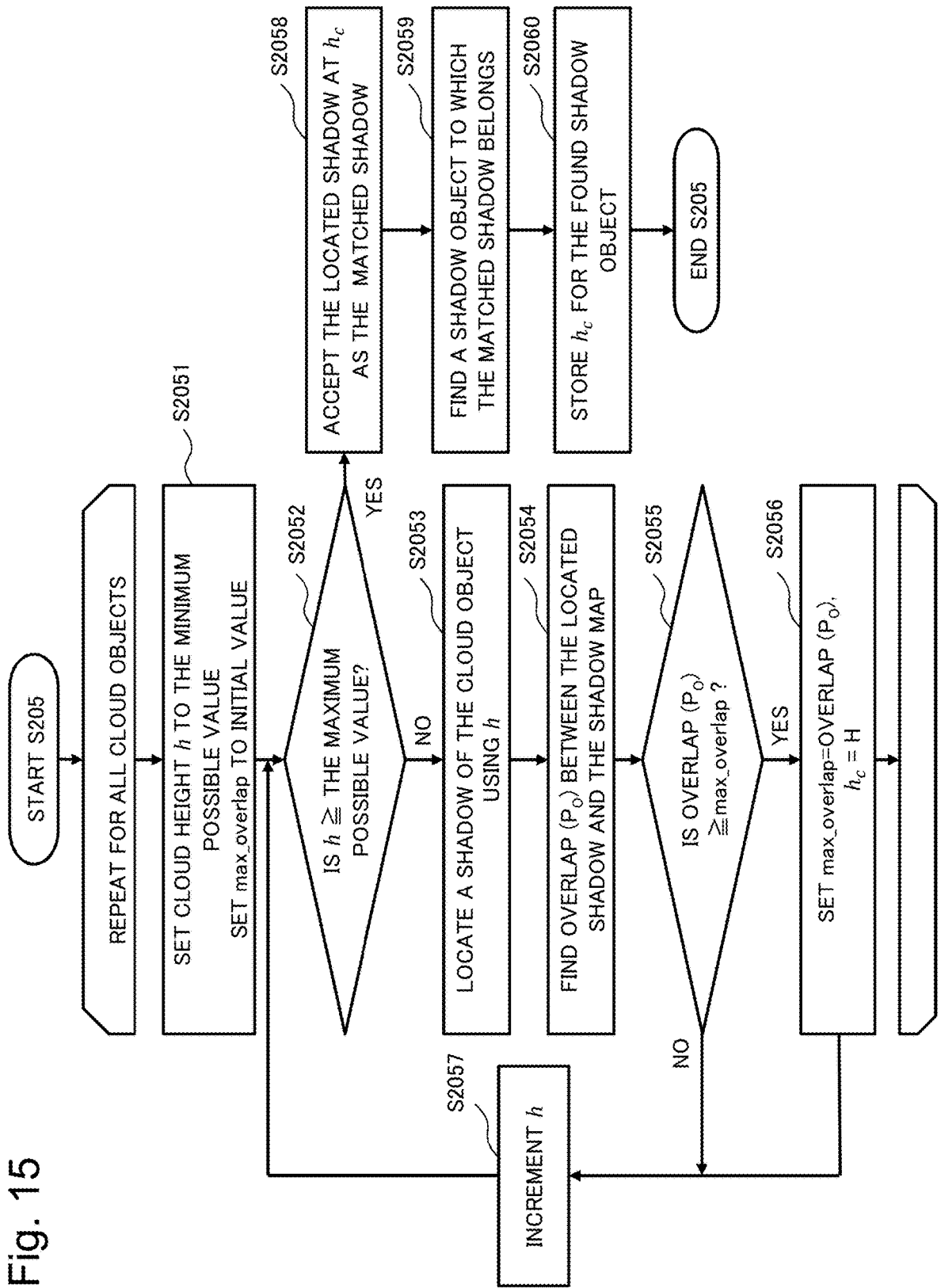
FIG. 15 is a flow chart for the procedure of the step S205 in FIG. 12.

Next, the operation of the step S205 in FIG. 12 mentioned above will be described in detail. FIG. 15 shows a flowchart of the operation in the step S205. The minimum and maximum ranges of cloud are set in advance considering general heights of clouds present in the earth atmosphere. For example, a lower cloud appears from about 3 km, an upper layer cloud appears up to about 15 km above, in the sky.

Steps S2051 and S2060 are executed for all shadow objects.

In the step S2051, cloud height estimation unit 25 sets a cloud height (h) to the minimum of a range for cloud heights as a tentative value and a maximum overlap which shows maximum overlap ratio between a shadow object determined by a cloud height (h) and the shadow map (max_overlap) to 0. The value of max_overlap is repeatedly being updated throughout iterations so as to find a maximum overlap. At every iteration, if the overlap at the current iteration is greater than the current max_overlap value, the algorithm replaces max_overlap with overlap value at the current iteration.

In the step S2052, cloud height estimation unit 25 checks if a cloud height (h) is equal to or greater than the maximum of a range for cloud heights.

If a cloud height (h) is equal to or greater than the maximum of a range for cloud heights, the process proceeds to step S2058, otherwise, the process proceeds to step S2053.

In the step S2053, for a cloud object, cloud height estimation unit 25 locates a shadow object based on a geometric model in equation (4) by using the current value of cloud height (h) as $h_c$. The percentage of the overlap between the located shadow object and the shadow map is calculated as shown below.

$$P_o = \frac{N_c}{N_T} \times 100 \qquad (9)$$

where $P_o$ is the percentage of the overlap, $N_c$ is the number of pixels common between the located shadow object and the shadow map, $N_T$ is the total number of pixels in the located shadow object (same as the corresponding cloud object). When the value of "h" is matching the actual height of a cloud (corresponding to the cloud object), the shapes of the located shadow object and the map also overlaps almost completely. Therefore, by increasing the height of the cloud object gradually, cloud height estimation unit 25 can find the height where the located shadow object and the shadow map overlap completely or almost completely, as the height where the cloud actually exists.

In the step S2055, cloud height estimation unit 25 checks if the calculated percentage of the overlap ($P_o$) is equal to or greater than the max_overlap.

If the calculated percentage of the overlap ($P_o$) is greater than the max_overlap, the max_overlap is replaced by the calculated percentage of the overlap ($P_o$) and the value of h is held as a height of the cloud object $h_c$ in the step S2056.

If the calculated percentage of the overlap ($P_o$) is smaller than the max_overlap, cloud height estimation unit 25 increments h in the step S2057 by a unit step, such as h=h plus 10 meter, and returns to the step S2052.

At the step S2052, if a cloud height (h) is equal to or greater than the maximum of a range for cloud heights, then in the step S2058, cloud height estimation unit 25 accepts lastly stored $h_c$ as a height of the cloud object and the located shadow for $h_c$ as the matched shadow.

In the step S2059, cloud height estimation unit 25 finds the shadow object to which the matched shadow belongs by the majority voting. Cloud height estimation unit 25 selects a shadow object to which the maximum number of pixels in the matched shadow belong.

In the step S2060, cloud height estimation unit 25 stores the height $h_c$ for the found shadow object as a height of the occluding cloud.

The procedure described above for finding a height of a cloud takes a brute-force approach by checking all possible values of a cloud height.

The specific operation of cloud height estimation unit 25 and the step S205 in FIG. 12 ends here.

There can be alternatives for some of the steps described above in the processes of the second example embodiment in accordance with the present invention.

For example, in the process of step S201 and S203 in FIG. 12, shadow map detection unit 23 can derive a gray scale intensity image from the input multispectral image in the step S2011 of FIG. 13 by a weighted averaging operation instead of equation (5) while the weights being decided by the spectral characteristics of the skylight.

In the process of the step S201 in FIG. 12, the step S2012 in FIG. 13 can be skipped by appropriately adjusting quantization levels in the step S2013.

In the process of the step S203 in FIG. 12, the step S2032 in FIG. 14 can be skipped by appropriately modifying the process in the step S2035. If a complement of an image is not taken in the step S2032, shadow map detection unit 23 can find dark pixels with a homogeneous texture as shadow pixels.

In the process of the step S205 in FIG. 12, instead of taking the brute-force approach, cloud height estimation unit 25 can set the minimum and the maximum values of a cloud height for the search by domain knowledge about cloud classes and their typical heights. Further, if particular wavelength bands are present in an image then an initial value of a cloud height can be estimated by a method described in NPL 3.

Effect of the Second Embodiment

Image processing device 200 of the second embodiment in accordance with the present invention finds a height of the occluding cloud for a cloud shadow in an input image from the input image itself. Image processing device 100 determines a height of an occluding cloud based on a cloud class and its typical height stored in a cloud storage. However, domain knowledge can provide only a range of possible heights for a cloud class, but not the exact height. Therefore, there is a possibility of locating a shadow inaccurately.

In contrast, image processing device 200 of the second embodiment determines a height of an occluding cloud from the input image itself. This ensures a correct location for a shadow and a correct correlation between a cloud and a shadow. Therefore, accuracy of the detection and the removal of cloud shadows is further improved.

Third Example Embodiment

An image processing device 300 of the third example embodiment in accordance with the present invention includes a minimum configuration of the image processing devices according to the first and second example embodiments.

Figure 17:
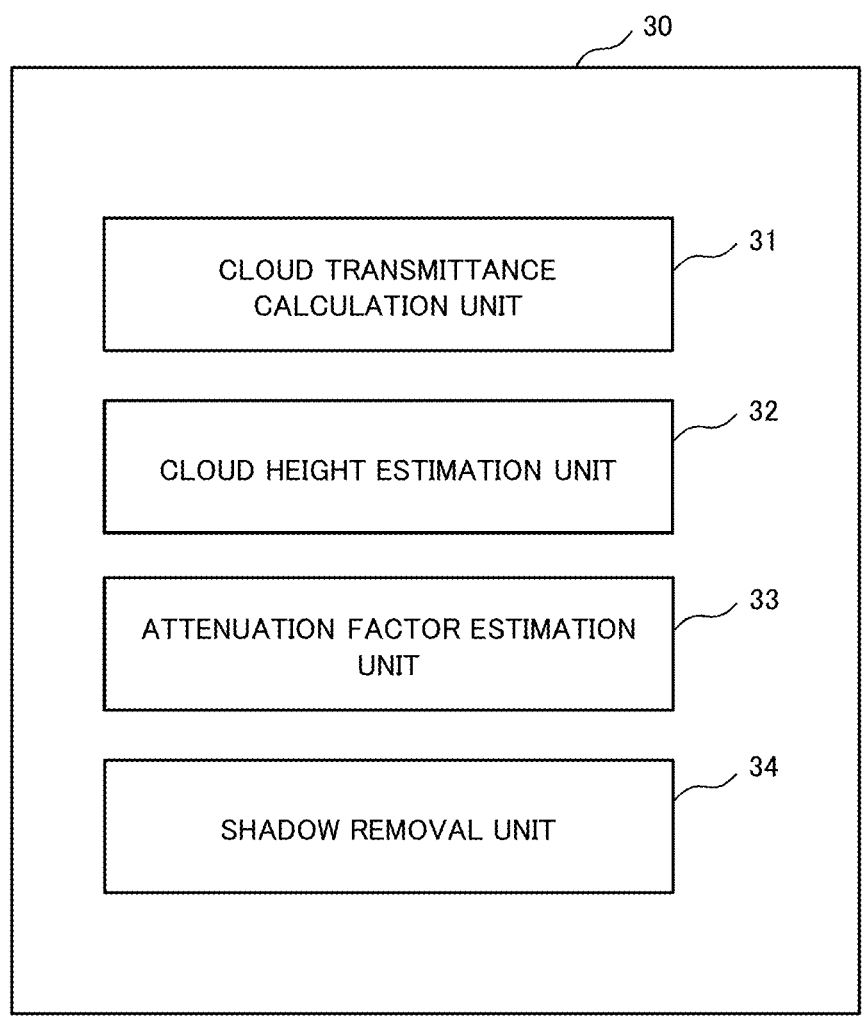
FIG. 17 is a diagram of the third example embodiment in accordance with the present invention.

FIG. 17 is a block diagram showing the configuration of the image processing device 300 of the third example embodiment in accordance with the present invention. The image processing device 300 for detection and correction of influence caused by one or more clouds includes: cloud transmittance calculation unit 31, cloud height estimation unit 32, attenuation factor estimation unit 33 and shadow removal unit 34.

Cloud transmittance calculation unit 31 calculates transmittance of the one or more clouds in an input image, for each pixel.

Cloud height estimation unit 32 determines estimation of a height from the ground to each cloud in the input image for the each pixel to detect position of corresponding one or more shadows.

Attenuation factor estimation unit 33 calculates attenuation factors for the direct sun irradiance by applying an averaging filter to the cloud transmittance calculated, for the each pixel.

Shadow removal unit 34 corrects pixels affected by the one or more shadows, based on a physical model of a cloud shadow formation by employing the attenuation factors calculated, and outputs an image which includes the corrected pixels.

The effect of the third example embodiment in accordance with the present invention is capable to accurately detect pixels covered by cloud shadows and remove effects of the cloud shadows in an input image. The reason is that utilizing cloud transmittance for the cloud shadow removal, such as, cloud transmittance calculation unit 31 calculates transmittance of a cloud in an input image, for each pixel, attenuation factor estimation unit 33 calculates attenuation factors for the direct sun irradiance by applying an averaging filter to the cloud transmittance, and shadow removal unit 34 corrects pixels based on a physical model of a cloud shadow formation by employing the attenuation factors.

Configuration of Information Processing Apparatus

Figure 18:
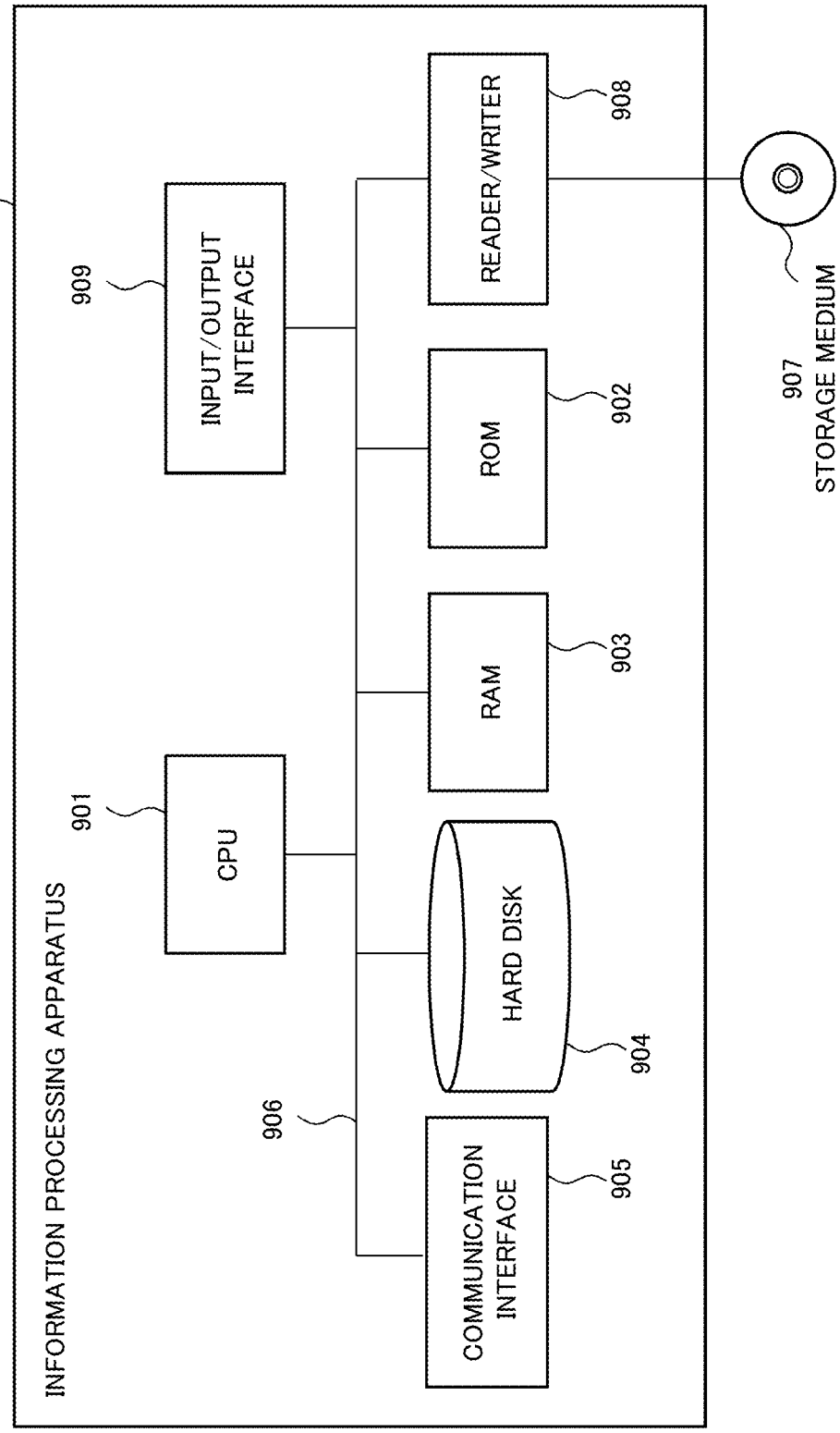
FIG. 18 shows an exemplary computer configuration used in embodiments in accordance with the present invention.

FIG. 18 illustrates, by way of example, a configuration of an information processing apparatus 900 (computer) which can implement an image processing device relevant to an example embodiment of the present invention. In other words, FIG. 18 illustrates a configuration of a computer (information processing apparatus) capable of implementing the devices in FIGS. 1, 11 and 17, representing a hardware environment where the individual functions in the above-described example embodiments can be implemented.

The information processing apparatus 900 illustrated in FIG. 18 includes the following components:
CPU 901 (Central_Processing_Unit);
ROM 902 (Read_Only_Memory);
RAM 903 (Random_Access_Memory);
Hard disk 904 (storage device);
Communication interface to an external device 905;
Reader/writer 908 capable of reading and writing data stored in a storage medium 907 such as CD-ROM (Compact-_Disc_Read_Only_Memory); and
Input/output interface 909.

The information processing apparatus 900 is a general computer where these components are connected via a bus 906 (communication line).

The present invention explained with the above-described example embodiments as examples is accomplished by providing the information processing apparatus 900 illustrated in FIG. 18 with a computer program which is capable of implementing the functions illustrated in the block diagrams (FIGS. 1, 11 and 17) or the flowcharts (FIGS. 8-10 and 12-15) referenced in the explanation of these example embodiments, and then by reading the computer program into the CPU 901 in such hardware, interpreting it, and executing it. The computer program provided to the apparatus can be stored in a volatile readable and writable storage memory (RAM 903) or in a non-volatile storage device such as the hard disk 904.

In addition, in the case described above, general procedures can now be used to provide the computer program to such hardware. These procedures include, for example, installing the computer program into the apparatus via any of various storage medium 907 such as CD-ROM, or downloading it from an external source via communication lines such as the Internet. In these cases, the present invention can be seen as being composed of codes forming such computer program or being composed of the storage medium 907 storing the codes.

The processes described in all example embodiments illustrated above are just an example and there could be other possible alternatives for steps involved within a scope of obvious to those skilled in the art.

Supplementary Notes

A part or all of the example embodiments can be described as the following supplementary notes.
(Supplementary Note 1)

An image processing device for detection and correction of influence caused by one or more clouds, comprising:

a cloud transmittance calculation means for calculating transmittance of the one or more clouds in an input image, for each pixel;

a cloud height estimation means for determining estimation of a height from the ground to each cloud in the input image for the each pixel to detect position of corresponding one or more shadows;

an attenuation factor estimation means for calculating attenuation factors for the direct sun irradiance by applying an averaging filter to the cloud transmittance calculated, for the each pixel; and a shadow removal means for removing the one or more shadows by correcting pixels affected by the one or more shadows, based on a physical model of a cloud shadow formation by employing the attenuation factors calculated and the position, and outputting an image which includes the pixels corrected.
(Supplementary Note 2)

The image processing device according to supplementary note 1, further comprising:

a cloud data storage for storing cloud information to classify cloud classes including a height of each cloud class, and a cloud classification means for classifying the each pixel affected by a cloud into one of cloud classes based on the cloud information stored in the cloud data storage, wherein the cloud height estimation means determines the estimation of the height which corresponds to each of the cloud classes stored in the cloud data storage.
(Supplementary Note 3)

The image processing device according to supplementary note 1 or 2, further comprising:

a shadow detection means for detecting a shadow pixel on the input image corresponding a cloud pixel in the input image based on a geometric model by employing the height of each cloud obtained by the cloud height estimation means.
(Supplementary Note 4)

The image processing device according to supplementary note 1, further comprising:

a cloud map detection means for detecting a cloud map including pixels potentially affected by the one or more clouds in the input image, based on spatial and spectral properties of each cloud, and a cloud object detection means for detecting one or more cloud objects corresponding to the pixels potentially affected by the one or more clouds in the cloud map.
(Supplementary Note 5)

The image processing device according to supplementary note 1 or 4, further comprising:

a shadow map detection means for detecting a shadow map including pixels covered by a shadow corresponding to a cloud based on spatial and spectral properties of each shadow, and a shadow object detection means for detecting a shadow object corresponding to the pixel covered by the shadow in the shadow map, based on a geometric model by employing the height of each cloud determined.

(Supplementary Note 6)

The image processing device according to any one of supplementary notes 1 and 4-5, further comprising:

a shadow object expansion means for expanding an area of shadow objects spatially to include edges of the shadow objects for applying a structural element.

(Supplementary Note 7)

An image processing method for detection and correction of influence caused by one or more clouds, comprising:

calculating transmittance of the one or more clouds in an input image, for each pixel;

determining estimation of a height from the ground to each cloud in the input image for the each pixel to detect position of corresponding one or more shadows;

calculating attenuation factors for the direct sun irradiance by applying an averaging filter to the cloud transmittance calculated, for the each pixel; and removing the one or more shadows by correcting pixels affected by the one or more shadows, based on a physical model of a cloud shadow formation by employing the attenuation factors calculated and the position, and outputting an image which includes the pixels corrected.

(Supplementary Note 8)

The method according to supplementary note 7, further comprising:

classifying the each pixel affected by a cloud into one of cloud classes based on the cloud information, including a height of each cloud class, stored in a cloud data storage, wherein, in determining estimation of a height, the height corresponds to each of the cloud classes stored in the cloud data storage.

(Supplementary Note 9)

The method according to supplementary note 7 or 8, further comprising:

detecting a shadow pixel on the input image corresponding a cloud pixel in the input image based on a geometric model by employing the height of each cloud obtained by the cloud height estimation means.

(Supplementary Note 10)

The method according to supplementary note 7, further comprising:

detecting a cloud map including pixels potentially affected by the one or more clouds in the input image, based on spatial and spectral properties of each cloud, and detecting one or more cloud objects corresponding to the pixels potentially affected by the one or more clouds in the cloud map.

(Supplementary Note 11)

The method according to supplementary note 7 or 10, further comprising:

detecting a shadow map including pixels covered by a shadow corresponding to a cloud based on spatial and spectral properties of each shadow, and detecting a shadow object corresponding to the pixel covered by the shadow in the shadow map, based on a geometric model by employing the height of each cloud determined.

(Supplementary Note 12)

The method according to any one of supplementary notes 7 and 10-11, further comprising:

expanding an area of shadow objects spatially to include edges of the shadow objects for applying a structural element.

(Supplementary Note 13)

A computer readable storage medium storing an image processing program for causing a computer to detect and correct influence caused by one or more clouds, the program comprising:

calculating transmittance of the one or more clouds in an input image, for each pixel;

determining estimation of a height from the ground to each cloud in the input image for the each pixel to detect position of corresponding one or more shadows;

calculating attenuation factors for the direct sun irradiance by applying an averaging filter to the cloud transmittance calculated, for the each pixel; and removing the one or more shadows by correcting pixels affected by the one or more shadows, based on a physical model of a cloud shadow formation by employing the attenuation factors calculated and the position, and outputting an image which includes the pixels corrected.

(Supplementary Note 14)

The storage medium according to supplementary note 13, further the program comprising:

classifying the each pixel affected by a cloud into one of cloud classes based on the cloud information, including a height of each cloud class, stored in a cloud data storage, wherein, in determining estimation of a height, the height corresponds to each of the cloud classes stored in the cloud data storage.

(Supplementary Note 15)

The storage medium according to supplementary note 13 or 14, further the program comprising:

detecting a shadow pixel on the input image corresponding a cloud pixel in the input image based on a geometric model by employing the height of each cloud obtained by the cloud height estimation means;

(Supplementary Note 16)

The storage medium according to supplementary note 13, further the program comprising:

detecting a cloud map including pixels potentially affected by the one or more clouds in the input image, based on spatial and spectral properties of each cloud, and detecting one or more cloud objects corresponding to the pixels potentially affected by the one or more clouds in the cloud map.

(Supplementary Note 17)

The storage medium according to supplementary note 13 or 16, further the program comprising:

detecting a shadow map including pixels covered by a shadow corresponding to a cloud based on spatial and spectral properties of each shadow, and detecting a shadow object corresponding to the pixels covered by the shadow in the shadow map, based on a geometric model by employing the height of each cloud determined.

(Supplementary Note 18)

The storage medium according to any one of supplementary notes 13 and 16-17, further the program comprising:

expanding an area of shadow objects spatially to include edges of the shadow objects for applying a structural element.

INDUSTRIAL APPLICABILITY

The present invention can be applied as a preprocessing tool for compensating environmental effects in capturing images by satellites before advanced level satellite image processing operations.

REFERENCE SIGNS LIST

01: pre-processing unit
02: matched filter derivation unit
03: attenuation factor estimation unit
04: shadow removal unit
05: output unit
10: input unit
11: cloud data storage
12: cloud transmittance calculation unit
13: cloud classification unit
14: cloud height estimation unit
15: shadow detection unit
16: attenuation factor estimation unit
17: atmosphere modelling unit
18, 18a: shadow removal unit
19: output unit
21: cloud map detection unit
22: cloud object detection unit
23: shadow map detection unit
24: shadow object detection unit
25: cloud height estimation unit
26: shadow object expansion unit
31: cloud transmittance calculation unit
32: cloud height estimation unit
33: attenuation factor estimation unit
34: shadow removal unit
100: image processing device
200: image processing device
300: image processing device
900: information processing apparatus
901: CPU
902: ROM
903: RAM
904: hard disk
905: communication interface
906: bus
907: storage medium
908: reader/writer
909: input/output interface

What is claimed is:

1. An image processing device for detection and correction of influence caused by one or more clouds, comprising:
a memory, and
one or more processors functioning as:
a cloud transmittance calculation unit configured to calculate transmittance of the one or more clouds in an input image, for each pixel;
a cloud height estimation unit configured to determine estimation of a height from the ground to each cloud in the input image for the each pixel to detect position of corresponding one or more shadows;
an attenuation factor estimation unit configured to calculate attenuation factors for the direct sun irradiance by applying an averaging filter to the cloud transmittance calculated, for the each pixel; and
a shadow removal unit configured to remove the one or more shadows by correcting pixels affected by the one or more shadows, based on a physical model of a cloud shadow formation by employing the attenuation factors calculated and the position, and outputting an image which includes the pixels corrected.

2. The image processing device according to claim 1, further comprising:
a cloud data storage for storing cloud information to classify cloud classes including a height of each cloud class, and
a cloud classification unit configured to classify the each pixel affected by a cloud into one of cloud classes based on the cloud information stored in the cloud data storage,
wherein the cloud height estimation unit determines the estimation of the height which corresponds to each of the cloud classes stored in the cloud data storage.

3. The image processing device according to claim 1, further comprising:
a shadow detection unit configured to detect a shadow pixel on the input image corresponding a cloud pixel in the input image based on a geometric model by employing the height of each cloud obtained by the cloud height estimation unit.

4. The image processing device according to claim 1, further comprising:
a cloud map detection unit configured to detect a cloud map including pixels potentially affected by the one or more clouds in the input image, based on spatial and spectral properties of each cloud, and
a cloud object detection unit configured to detect one or more cloud objects corresponding to the pixels potentially affected by the one or more clouds in the cloud map.

5. The image processing device according to claim 1, further comprising:
a shadow map detection unit configured to detect a shadow map including pixels covered by a shadow corresponding to a cloud based on spatial and spectral properties of each shadow, and
a shadow object detection unit configured to detect a shadow object corresponding to the pixel covered by the shadow in the shadow map, based on a geometric model by employing the height of each cloud determined.

6. The image processing device according to claim 1, further comprising:
a shadow object expansion unit configured to expand an area of shadow objects spatially to include edges of the shadow objects for applying a structural element.

7. An image processing method for detection and correction of influence caused by one or more clouds, comprising:
calculating transmittance of the one or more clouds in an input image, for each pixel;
determining estimation of a height from the ground to each cloud in the input image for the each pixel to detect position of corresponding one or more shadows;
calculating attenuation factors for the direct sun irradiance by applying an averaging filter to the cloud transmittance calculated, for the each pixel; and
removing the one or more shadows by correcting pixels affected by the one or more shadows, based on a physical model of a cloud shadow formation by employing the attenuation factors calculated and the position, and outputting an image which includes the pixels corrected.

8. The method according to claim 7, further comprising:
classifying the each pixel affected by a cloud into one of cloud classes based on the cloud information, including a height of each cloud class, stored in a cloud data storage,
wherein, in determining estimation of a height, the height corresponds to each of the cloud classes stored in the cloud data storage.

9. The method according to claim 7, further comprising:
detecting a shadow pixel on the input image corresponding a cloud pixel in the input image based on a geometric model by employing the height of each cloud.

10. The method according to claim 7, further comprising:
detecting a cloud map including pixels potentially affected by the one or more clouds in the input image, based on spatial and spectral properties of each cloud, and detecting one or more cloud objects corresponding to the pixels potentially affected by the one or more clouds in the cloud map.

11. The method according to claim 7, further comprising:
detecting a shadow map including pixels covered by a shadow corresponding to a cloud based on spatial and spectral properties of each shadow, and
detecting a shadow object corresponding to the pixel covered by the shadow in the shadow map, based on a geometric model by employing the height of each cloud determined.

12. The method according to claim 7, further comprising:
expanding an area of shadow objects spatially to include edges of the shadow objects for applying a structural element.

13. A non-transitory computer readable storage medium storing an image processing program for causing a computer to detect and correct influence caused by one or more clouds, the program comprising:
calculating transmittance of the one or more clouds in an input image, for each pixel;
determining estimation of a height from the ground to each cloud in the input image for the each pixel to detect position of corresponding one or more shadows;
calculating attenuation factors for the direct sun irradiance by applying an averaging filter to the cloud transmittance calculated, for the each pixel; and
removing the one or more shadows by correcting pixels affected by the one or more shadows, based on a physical model of a cloud shadow formation by employing the attenuation factors calculated and the position, and outputting an image which includes the pixels corrected.

14. The storage medium according to claim 13, further the program comprising:
classifying the each pixel affected by a cloud into one of cloud classes based on the cloud information, including a height of each cloud class, stored in a cloud data storage,
wherein, in determining estimation of a height, the height corresponds to each of the cloud classes stored in the cloud data storage.

15. The storage medium according to claim 13, further the program comprising:
detecting a shadow pixel on the input image corresponding a cloud pixel in the input image based on a geometric model by employing the height of each cloud.

16. The storage medium according to claim 13, further the program comprising:
detecting a cloud map including pixels potentially affected by the one or more clouds in the input image, based on spatial and spectral properties of each cloud, and
detecting one or more cloud objects corresponding to the pixels potentially affected by the one or more clouds in the cloud map.

17. The storage medium according to claim 13, further the program comprising:
detecting a shadow map including pixels covered by a shadow corresponding to a cloud based on spatial and spectral properties of each shadow, and
detecting a shadow object corresponding to the pixels covered by the shadow in the shadow map, based on a geometric model by employing the height of each cloud determined.

18. The storage medium according to claim 13, further the program comprising:
expanding an area of shadow objects spatially to include edges of the shadow objects for applying a structural element.

* * * * *